United States Patent
Ko

(10) Patent No.: US 10,551,531 B2
(45) Date of Patent: Feb. 4, 2020

(54) HYBRID DIFFRACTION GRATING, MOLD INSERT AND MANUFACTURING METHODS THEREOF

(71) Applicant: OtO Photonics Inc., Hsinchu (TW)

(72) Inventor: Cheng-Hao Ko, Hsinchu County (TW)

( * ) Notice: Subject to any disclaimer, the term of this patent is extended or adjusted under 35 U.S.C. 154(b) by 899 days.

(21) Appl. No.: 13/656,028

(22) Filed: Oct. 19, 2012

(65) Prior Publication Data

US 2013/0170043 A1 Jul. 4, 2013

(30) Foreign Application Priority Data

Dec. 30, 2011 (TW) .............................. 100149898 A

(51) Int. Cl.
*G02B 5/18* (2006.01)

(52) U.S. Cl.
CPC ......... *G02B 5/1809* (2013.01); *G02B 5/1852* (2013.01); *G02B 5/1857* (2013.01)

(58) Field of Classification Search
CPC .. G02B 5/1809; G02B 5/1857; G02B 5/1852; G02B 5/1861; G02B 6/02009; G02B 5/1842; G02B 27/0944; H01L 21/30608; G01J 3/18; G01J 3/20; G01J 3/50
USPC ......... 359/569–575, 562–566, 900; 427/133, 427/162, 307; 430/265, 302; 216/12, 24, 216/41, 52, 55, 56, 72–81
See application file for complete search history.

(56) References Cited

U.S. PATENT DOCUMENTS

| | | | | |
|---|---|---|---|---|
| 4,330,175 A * | 5/1982 | Fujii | ................... | G02B 5/1857 257/E21.223 |
| 4,405,405 A | 9/1983 | Fujii et al. | | |
| 5,080,465 A * | 1/1992 | Laude | ................. | G02B 5/1866 216/24 |
| 6,995,910 B2 | 2/2006 | Fabiny et al. | | |
| 2003/0124435 A1* | 7/2003 | Rich | ................... | B29C 35/0888 430/1 |
| 2004/0184732 A1* | 9/2004 | Zhou | ......................... | G01J 3/02 385/37 |
| 2005/0207012 A1* | 9/2005 | Arnold | ..................... | G02B 5/18 359/571 |
| 2010/0284084 A1* | 11/2010 | Ishibe | ...................... | B23C 3/00 359/571 |
| 2012/0250157 A1* | 10/2012 | Na | ...................... | G02B 5/1857 359/571 |

FOREIGN PATENT DOCUMENTS

| CN | 1605892 A | 4/2005 |
|---|---|---|
| CN | 101726779 A | 6/2010 |
| CN | 102169928 A | 8/2011 |

(Continued)

*Primary Examiner* — Mustak Choudhury
(74) *Attorney, Agent, or Firm* — Cheng-Ju Chiang

(57) ABSTRACT

A hybrid diffraction grating, a mold used to produce the hybrid diffraction grating, and their manufacturing methods are described. In one aspect, a hybrid diffraction grating comprises a grating main body and a reflective layer. The grating main body comprises numerous diffraction structures. When viewed along a top-view direction, the numerous diffraction structures are arranged in a pattern defined by a profile. The profile determines various blaze angles of the numerous diffraction structures. The reflective layer, disposed on the diffraction structures, exhibits characteristics of the numerous diffraction structures.

18 Claims, 39 Drawing Sheets

(56) References Cited

FOREIGN PATENT DOCUMENTS

| | | |
|---|---|---|
| CN | 102323633 A | 1/2012 |
| JP | S5643620 A | 4/1981 |
| TW | 594059 | 6/2004 |
| TW | I222534 | 10/2004 |
| TW | 201140148 A1 | 11/2011 |
| WO | WO2008081555 A | 7/2008 |

* cited by examiner

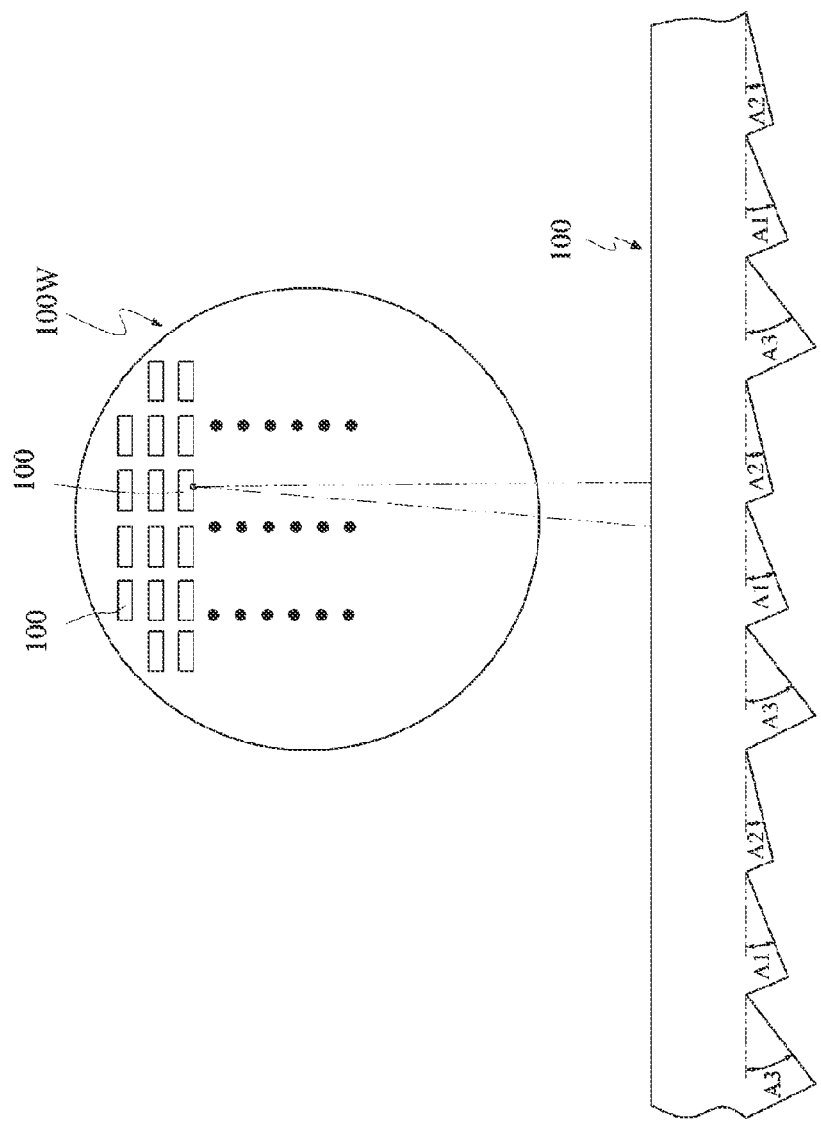

HYBRID DIFFRACTION GRATING, MOLD INSERT AND MANUFACTURING METHODS THEREOF

CROSS-REFERENCE TO RELATED PATENT APPLICATIONS

This application claims the priority benefit of Taiwan Patent Application No. 100149898, filed on Dec. 30, 2011. The above-identified patent application is hereby incorporated by reference in its entirety.

TECHNICAL FIELD

The present disclosure relates to a diffraction grating, and more particularly relates to a regular blaze grating (RBG) having a plurality of regular blaze angles, a mold used to make the diffraction grating, and their manufacturing methods.

BACKGROUND

Spectrometers are widely used in many fields such as photometric measurement of a radiation source, beam-splitting, and substance detection. A spectrometer typically includes an entrance slit to control the amount of light entering the spectrometer, and also includes a diffraction grating in combination with a collimation and a correcting lens to focus spectral components on an image plane. A photo detector can be placed on the image plane to detect individual spectral components.

FIG. 1 is a schematic diagram of a conventional spectrometer. Referring to FIG. 1, the conventional spectrometer 5100 includes a light source 5110, an input unit 5120, a collimating lens 5130, a plane grating 5140, a focusing lens 5150, and a linear photo detector 5160. Optical signals 5200 from the light source 5110 first pass through the input unit 5120 and, after being collimated by the collimating lens 5130, the optical signals 5200 reach the plane grating 5140. The macroscopic profile of the diffraction pattern 5142 of the plane grating 5140 is a plane. The diffraction pattern of the conventional plane grating is created by diamond tools.

The diffraction pattern of the conventional plane grating, which is a regular blaze grating (RBG), is shown in FIG. 2. The diffraction pattern has a fixed pitch P1 and a fixed blaze angle (i.e. regular blaze angle) A1. A line connecting two vertices 5144A and 5144B of the diffraction structure 5144 forms a baseline 5144C. A grating normal 5144N is perpendicular to the baseline 5144C, and an effective normal line 5144M is perpendicular to an effective surface 5144D. As incident light LI strikes the effective surface 5144D, reflected light LR (also known as O-order light), 1-order diffracted light LD+1 and LD−1, and light of 2-order or above will be produced (not shown in FIG. 2). Blaze angle A1 is the angle formed between the grating normal 5144N and the effective normal line 5144M, which is equivalent to the angle formed between the baseline 5144C and the effective surface 5144D. In FIG. 2, the blaze angle of each of the diffraction structures 5144 is equal to A1. The diffraction pattern of this type of diffraction gratings is formed by diamond tools. Since every movement of the diamond tool can only produce one diffraction structure, and one diffraction grating normally contains thousands of diffraction structures, this traditional manufacturing method is very time-consuming and expensive. Moreover, since the blade of the diamond tool is fixed, one diamond tool can only form a single type of diffraction structures with a single blaze angle.

FIG. 3 is a schematic diagram of another conventional grating. As shown in FIG. 3, a plane grating 5140' has a fixed pitch P1 and two blaze angles, A1 and A2. The diffraction pattern of the plane grating 5140' is also made by diamond tools; however, two types of cutting tools are needed. First, a first type of cutting tool is used to form diffraction structures having a blaze angle A1. Then, the first type of cutting tool is replaced by a second type of cutting tool, and the second type of cutting tool is used to form diffraction structures having a blaze angle A2.

It is worth mentioning that there is always a positioning problem when changing the cutting tools. For example, if there are errors incurred during the positioning of the second cutting tool, the errors will be introduced into the resulting grating. As another example, errors on the starting engraving point of the second cutting tool will also be introduced into the resulting grating. Particularly, since the dimension of a diffraction structure is very small, e.g., only a few microns (um), small errors incurred during the positioning of the second cutting tool will result in a serious problem. For example, discontinuation in the diffraction structures will result in discontinued output optical signals. Errors may even produce serious stray light, thus adversely affecting output signals. Even worse, it may make diffraction gratings no longer useful.

Accordingly, when using the traditional diamond tool to make a diffraction grating with various blaze angles, the positioning problem will arise at each time the cutting tool is being changed, thus increasing errors in the resulting diffraction grating.

SUMMARY

In light of the foregoing, it is an object of the present disclosure to provide a hybrid diffraction grating having variable blaze angles, a mold used to make the hybrid diffraction grating, and their manufacturing methods.

To achieve the above objective, the present disclosure provides a method of manufacturing a hybrid diffraction grating having a plurality of diffraction structures. The method may comprise forming a first patterned layer on a main body by performing a replication process on a surface of the main body along a first direction perpendicular to the surface of a main body based on a profile. The profile may comprise a top-view pattern of the plurality of diffraction structures. The top-view pattern may define a plurality of blaze angles of the plurality of diffraction structures. The method may further comprise forming a reflective layer on the main body by executing a reflective layer forming process via the first patterned layer. The reflective layer may exhibit the profile as viewed along the first direction.

The present disclosure also provides a diffraction grating. The diffraction grating may comprise a grating main body comprising a plurality of diffraction structures. The plurality of diffraction structures may include a plurality of blaze angles and may be arranged in a pattern defined by a corresponding profile when viewed from a top-view perspective of the grating main body. The profile may define the plurality of blaze angles. The diffraction grating may further comprise a reflective layer disposed on the grating main body. The reflective layer may have characteristics of the plurality diffraction structures.

The present disclosure also provides a method of manufacturing a mold. The method may comprise performing a replication process on a surface of a main body along a first direction perpendicular to the surface of the main body based on a profile. The profile may comprise a top-view pattern of the plurality of diffraction structures when viewed along the first direction. The top-view pattern may define a plurality of blaze angles of the plurality of diffraction structures.

The present disclosure further provides a method of manufacturing a diffraction grating. The method may comprise: forming a three-dimensional topography using a profile; forming a mold using the three-dimensional topography; forming a grating main body using the mold, the grating main body comprising a plurality of diffraction structures; and disposing a reflective layer on the grating main body to form the diffraction grating. The profile may comprise a top-view pattern of the plurality of diffraction structures. The top-view pattern may define a plurality of blaze angles of the plurality of diffraction structures.

The present disclosure also provides a mold used for replicating a diffraction grating. The mold may comprise a main body comprising a plurality of diffraction structures. The plurality of diffraction structures may be arranged in a pattern as viewed along a first direction perpendicular to a surface of the main body. A profile may define the pattern and a plurality of blaze angles of the plurality of diffraction structures.

The present disclosure further provides a method of manufacturing a hybrid diffraction grating having a plurality of diffraction structures. The method may comprise forming a first main body having a plurality of diffraction structures using a mold with a first replication process. The plurality of diffraction structures may be arranged in a pattern when viewed from a first direction perpendicular to a surface of the first main body. The pattern may be defined by a first profile of the mold. The first profile may define a plurality of blaze angles of the plurality of diffraction structures. The method may further comprise executing a reflective layer forming process to deposit a reflective layer on the plurality of diffraction structures.

In order to make the content of the present disclosure clearer and more understandable, preferred embodiments of the present disclosure will be described in detail below with reference to the figures.

BRIEF DESCRIPTION OF DRAWINGS

FIG. 6H is a schematic diagram of a wafer containing a plurality of diffraction gratings in accordance with the first embodiment of the present disclosure.

DETAILED DESCRIPTION OF PREFERRED EMBODIMENTS

Overview

Conventional technology uses different types of diamond tools to obtain different blaze angles, thus varying the diffraction efficiency curve of the diffraction grating. However, there is a limit to how much the diffraction efficiency curve can be changed because the degree of the change in the diffraction efficiency curve is proportional to the number of cutting tools changed. In addition, since the positioning problem occurs each time the cutting tool is changed, serious errors may occur when changing the cutting tools and, as a result, more stray light may be generated.

In contrast, in the present disclosure, the blaze angle of each of the diffraction structures can be adjusted freely by changing the contour, or profile. The diffraction efficiency of the diffraction structure with respect to different wavelengths will also be changed with the change of the blaze angles. By changing the profile, each of the diffraction structures can be adjusted to increase the diffraction efficiency at a specific wavelength according to the design requirement. Assuming a hybrid diffraction grating contains 3,000 diffraction structures and there are 60 different blaze angles from which each of the diffraction structures can choose, there are thus at least 180,000 variations of diffraction efficiency curves. Accordingly, embodiments according to the present disclosure provide a designer with greater flexibility in designing the diffraction efficiency curve of diffraction gratings. Detailed description of embodiments of the present disclosure is provided below with reference to the figures.

Figure 1:
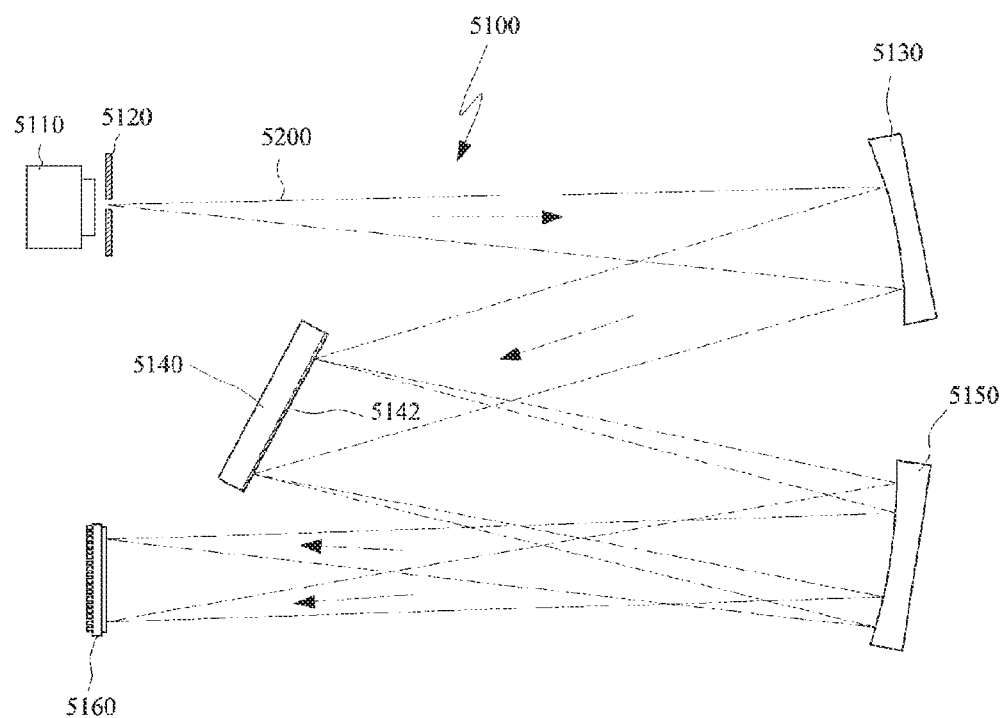
FIG. 1 is a schematic diagram of a conventional spectrometer.
Figure 2:
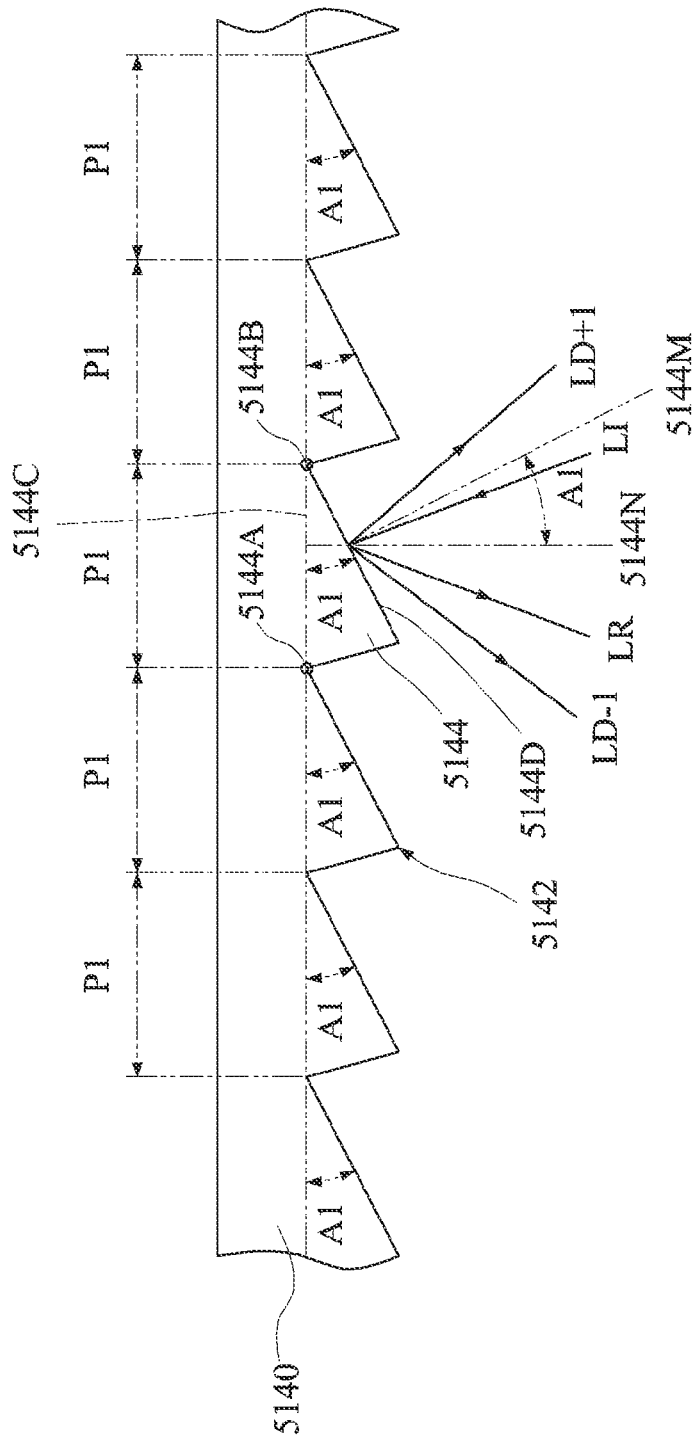
FIG. 2 is a schematic diagram of a diffraction grating shown in FIG. 1.
Figure 3:
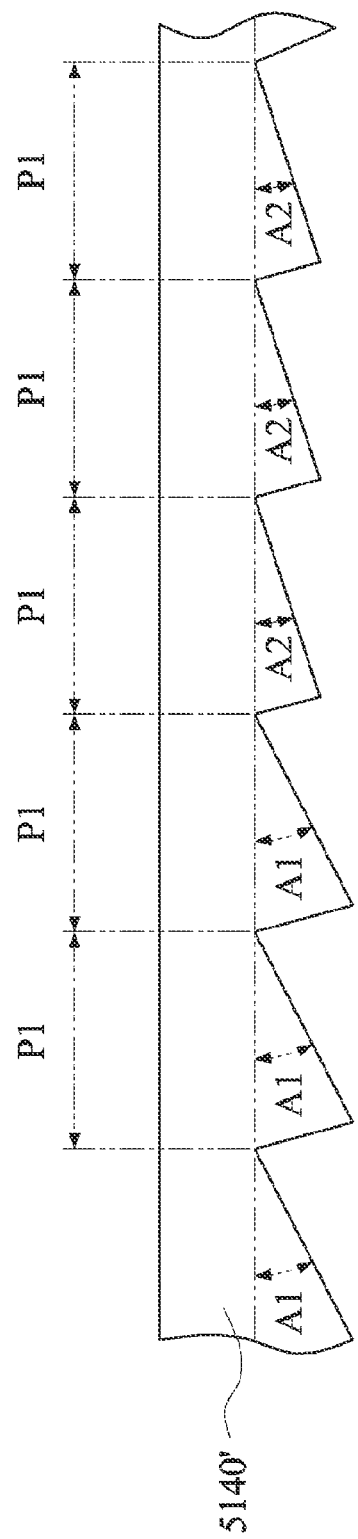
FIG. 3 is a schematic diagram of another conventional diffraction grating.
Figure 4A:
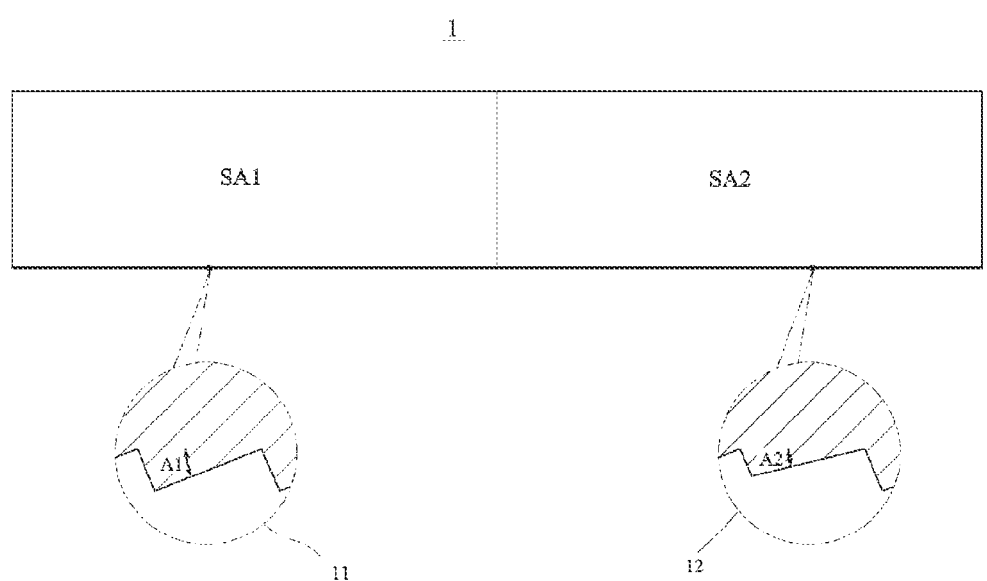
FIG. 4A is a schematic diagram of a diffraction grating divided into two sections.
Figure 4B:
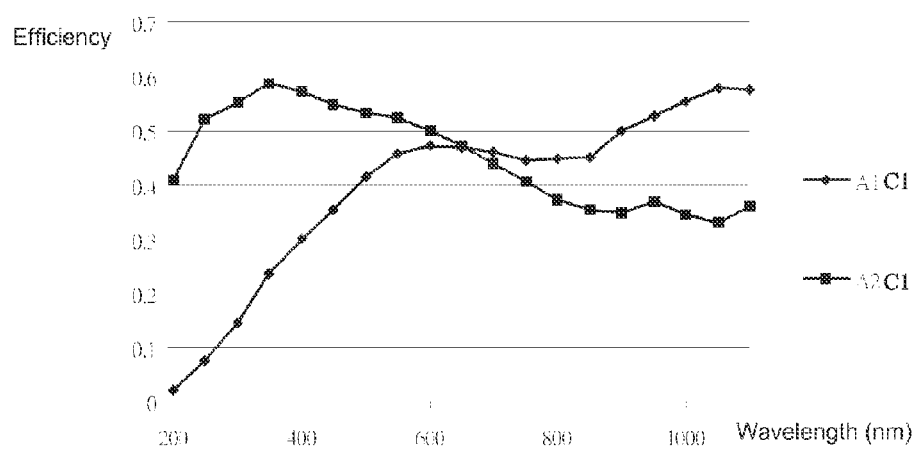
FIGS. 4B-4C are diffraction efficiency curves of the diffraction structures and an overall diffraction efficiency curve of the diffraction grating in FIG. 4A.
Figure 4C:
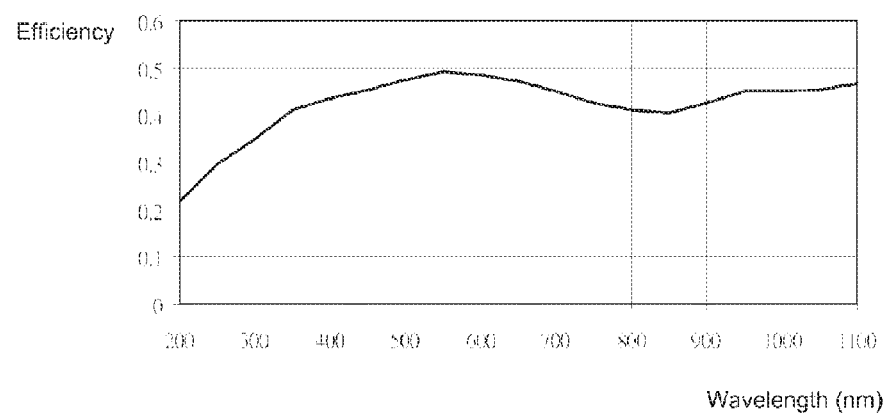

FIG. 4A is a schematic diagram of a diffraction grating 1 divided into two sections. The diffraction grating 1 in FIG. 4A is a plane grating having two sections, SA1 and SA2. Section SA1 has numerous identical diffraction structures 11, and section SA2 has numerous identical diffraction structures 12. The corresponding blaze angles of the diffraction structures 11 and 12 are A1 and A2, respectively. The diffraction structures 11 and 12 have the same pitch. As shown in FIG. 4B, the diffraction structures 11, 12 having different blaze angles exhibit different diffraction efficiency curves, A1C1 and A2C1, respectively. As shown in FIG. 4C, superimposition of the diffraction curve of the diffraction structure 11 and the diffraction curve of the diffraction structure 12 yields a total diffraction efficiency curve of the diffraction grating 1. In FIGS. 4B and 4C, the horizontal axis represents the diffraction wavelength, and the vertical axis represents the diffraction efficiency. As can be seen from FIGS. 4B and 4C, diffraction efficiencies of the diffraction grating 1 are different at wavelengths from 200 nm to 1100 nm.

Figure 4D:
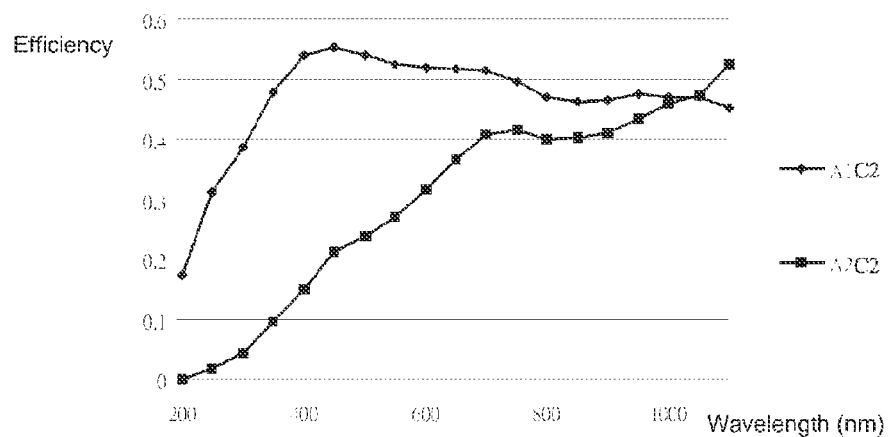
FIGS. 4D-4E are diffraction efficiency curves of each of the diffraction structures and an overall diffraction efficiency curve of an example diffraction grating.
Figure 4E:
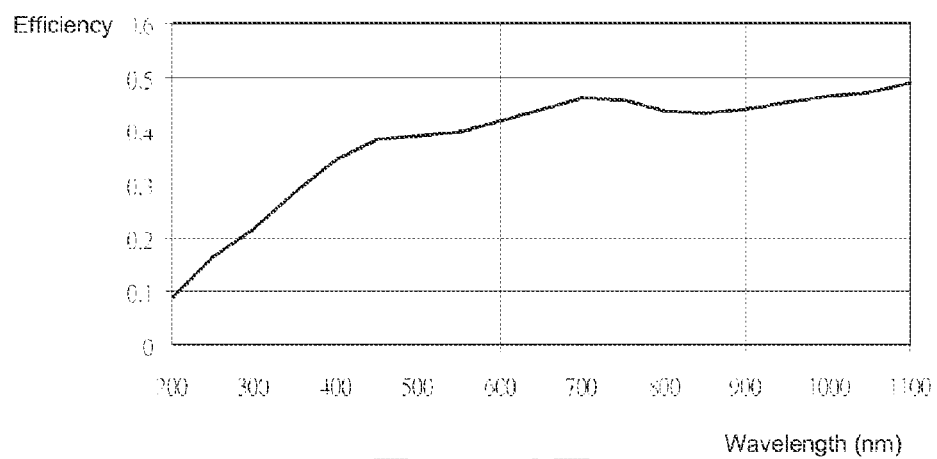

Of course, the total diffraction efficiency curve shown in FIG. 4C is still unable to meet all the design requirements. Some designs require improving efficiencies in the middle region of the total diffraction efficiency curve, and some designs require increasing efficiencies in the left region of the total diffraction efficiency curve, and so on. Therefore, ability that allows a designer to freely adjust the total diffraction efficiency curve of a diffraction grating according to specific requirements is highly desirable. For example, a designer can adjust the diffraction efficiency curve to obtain another diffraction grating. The diffraction efficiency curves of the newly designed diffraction grating are shown in FIGS. 4D and 4E, respectively. Because values of the blaze angles, A1 and A2, have been adjusted according to the design requirements, the diffraction efficiency curves, A1C2 and A2C2, as shown in FIG. 4D, are different from A1C1 and A2C1 shown in FIG. 4B, respectively. As a result, the total diffraction efficiency curve shown in FIG. 4E is different from that shown in FIG. 4C.

Figure 4F:
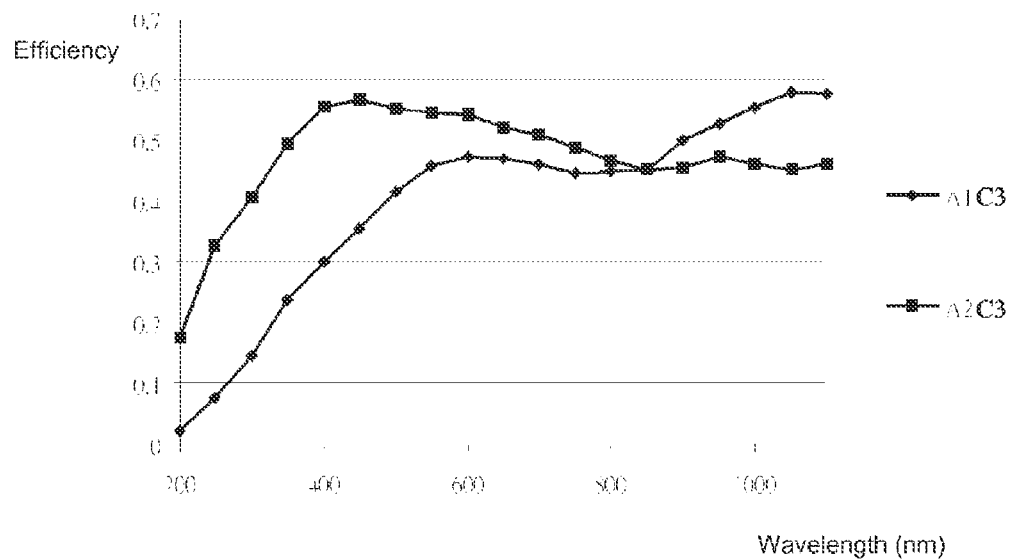
FIGS. 4F-4G are diffraction efficiency curves of each of the diffraction structures and an overall diffraction efficiency curve of an example diffraction grating.
Figure 4G:

Of course, a designer can also readjust the diffraction efficiency curve to obtain yet another diffraction grating. The diffraction efficiency curves of the newly designed diffraction grating are shown in FIGS. 4F and 4G, respectively. Because values of the blaze angles, A1 and A2, have been readjusted according to the new design requirements, diffraction efficiency curves, A1C3 and A2C3, as shown in FIG. 4E, are different not only from A1C1 and A2C1 shown in FIG. 4B but also from A1C2 and A2C2 shown in FIG. 4D. As a result, the total diffraction efficiency curve shown in FIG. 4G is also different from those shown in FIGS. 4C and 4E. Therefore, the total diffraction efficiency curve of a diffraction grating can be manipulated by adjusting the blaze angle of each of the diffraction structures.

It is worth mentioning that although in FIG. 4A, the diffraction structures with the blaze angles A1 and A2 are located in the sections SA1 and SA2, respectively. In other implementations similar effects can be obtained by arranging diffraction structures having a blaze angle of A1 and diffraction structures having a blaze angle of A2 next to each other.

First Embodiment

Figure 5A:
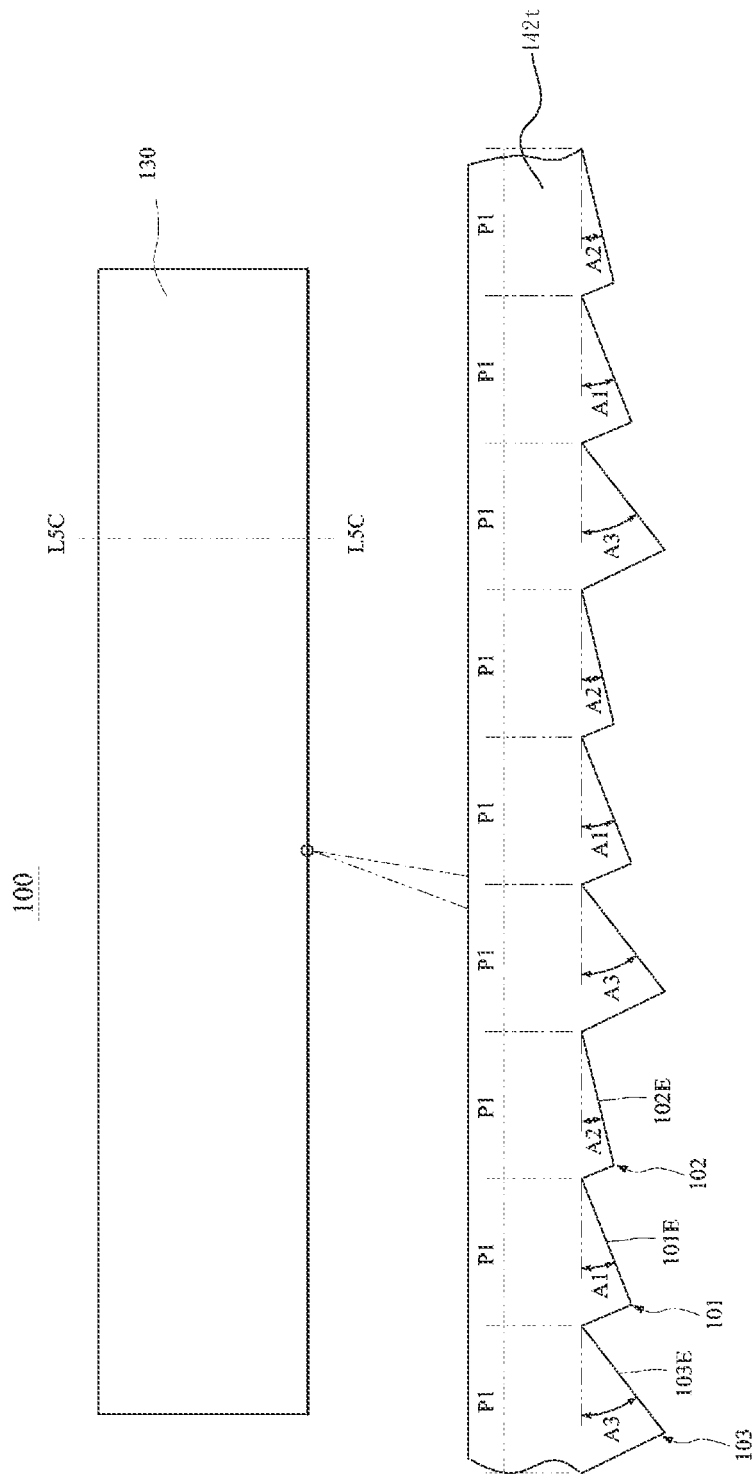
FIG. 5A is a schematic diagram of a diffraction grating in accordance with a first embodiment of the present disclosure.

FIG. 5A is a schematic diagram of a diffraction grating 100 in accordance with a first embodiment of the present disclosure. That is, FIG. 5A shows a top surface 142t of the diffraction grating 100. Referring to FIG. 5A, the hybrid diffraction grating 100 is a plane grating comprising one thousand diffraction structures 101, one thousand diffraction structures 102, and one thousand diffraction structures 103. The blaze angles of the diffraction structures 101, 102 and 103 are A1, A2, and A3, respectively, and the top surface 142t defines the diffraction structures 101, 102 and 103. Only the top surface 142t forms and defines the regular blaze angles A1, A2, and A3. The diffraction structures 101, 102, 103 are arranged in an orderly manner, and the ordering in one part of the diffraction structures is 103-101-102-103-101-102-103-101-102. The diffraction structures 101, 102, and 103 have the same pitch P1. The effective surfaces 101E, 102E, and 103E of the diffraction structures 101, 102, and 103 are planar. As used herein, the term "heterogeneous connecting portion" refers to a surface connecting different kinds of diffraction structures 103 and 101 (or 102 and 101, or 103 and 102), and the term "homogeneous connecting portion" refers to a surface connecting the same kinds of diffraction structures. In the first embodiment, there are a total of two thousand nine hundred and ninety-nine heterogeneous connecting portions, but no homogeneous connecting portions. In other embodiments, a diffraction grating may contain one or more homogeneous connecting portions.

Figure 5B:
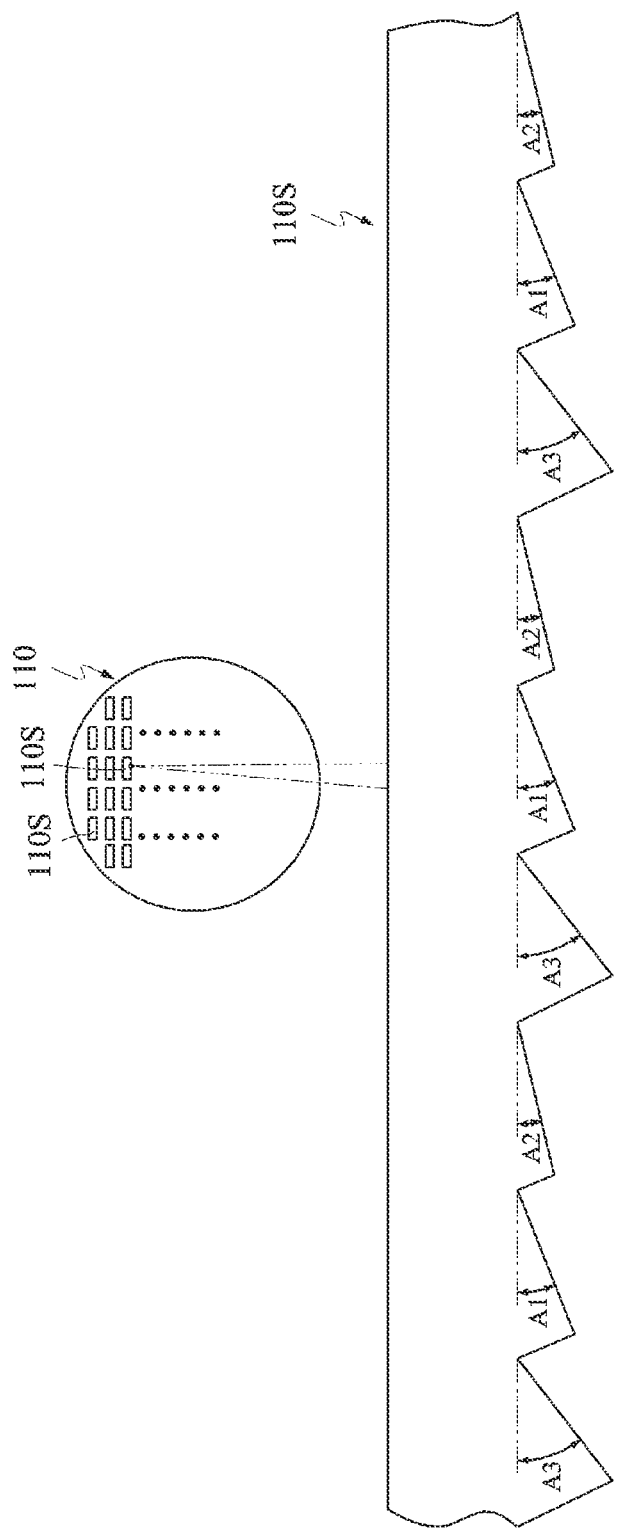
FIG. 5B is a schematic diagram of a profile of the first embodiment in accordance with the present disclosure.
Figure 5C:
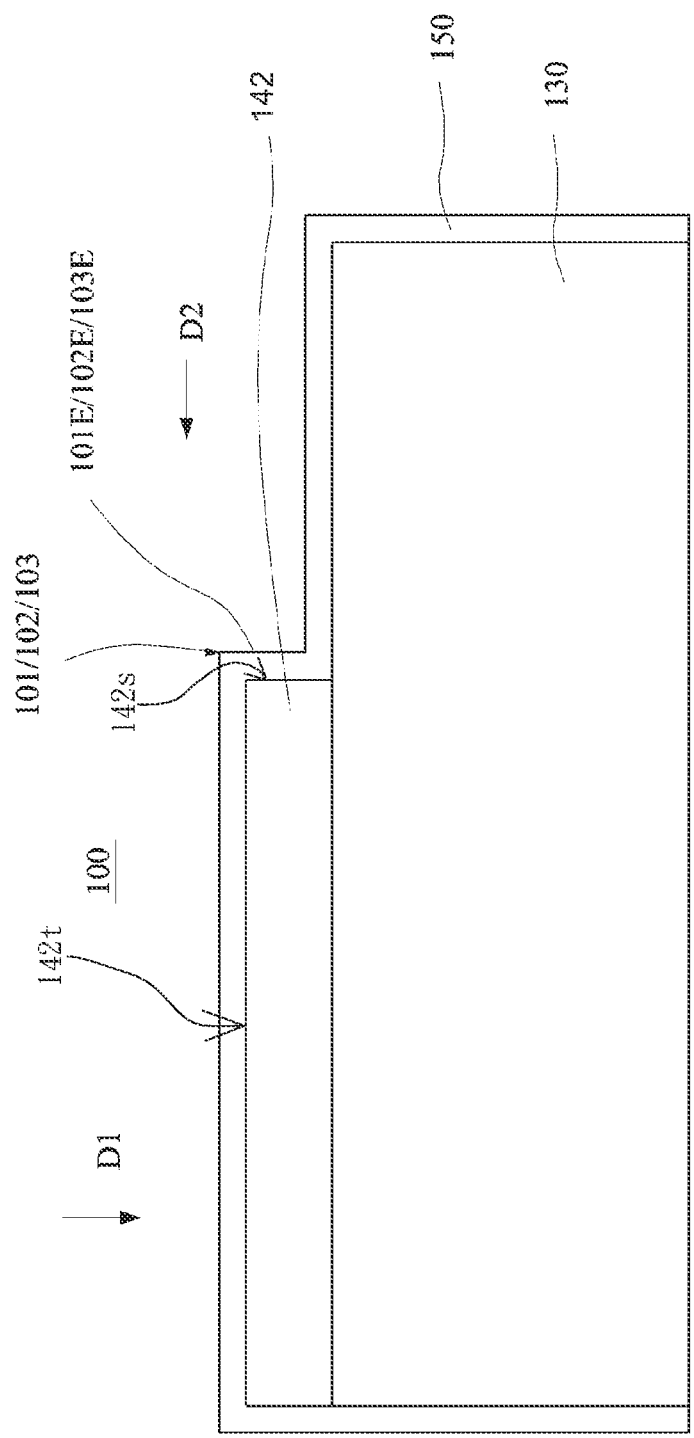
FIG. 5C is an enlarged schematic cross-sectional view of FIG. 5A taken along a line L5C-L5C.

FIG. 5B is a schematic diagram of a profile 110 of the first embodiment in accordance with the present disclosure. FIG. 5C is an enlarged schematic cross-sectional view of FIG. 5A taken along a line L5C-L5C. As shown in FIGS. 5A-5C, the diffraction grating 100 of the first embodiment comprises a main body 130, a first patterned layer 142, and a reflective layer 150. The reflective layer 150 is not shown in FIG. 5A in order to clearly illustrate the corresponding relationship between FIG. 5A and FIG. 5B. The first patterned layer 142 comprises numerous diffraction structures 101, 102, 103 and has a side surface 142s and the top surface 142t. When viewed from the top of the main body 130 along a top-view direction D1, the plurality of diffraction structures 101, 102, 103 form a top-view pattern 110S which is defined by the corresponding profile 110. The various blaze angles A1 to A3 of these diffraction structures 101-103 are also defined by the profile 110. In the first embodiment, a computer-generated profile may be utilized as an example to illustrate the profile 110. The profile 110 contains a top-view pattern 110S. The top-view pattern 110S corresponds to the top surface 142t. A single pattern 110S is used as an example in the first embodiment.

The reflective layer 150 is disposed on the diffraction structures 101, 102, 103, and possesses the same characteristics as the corresponding diffraction structures, thus it can diffract incident light and divide the diffracted light into spectral components.

Figure 5D:
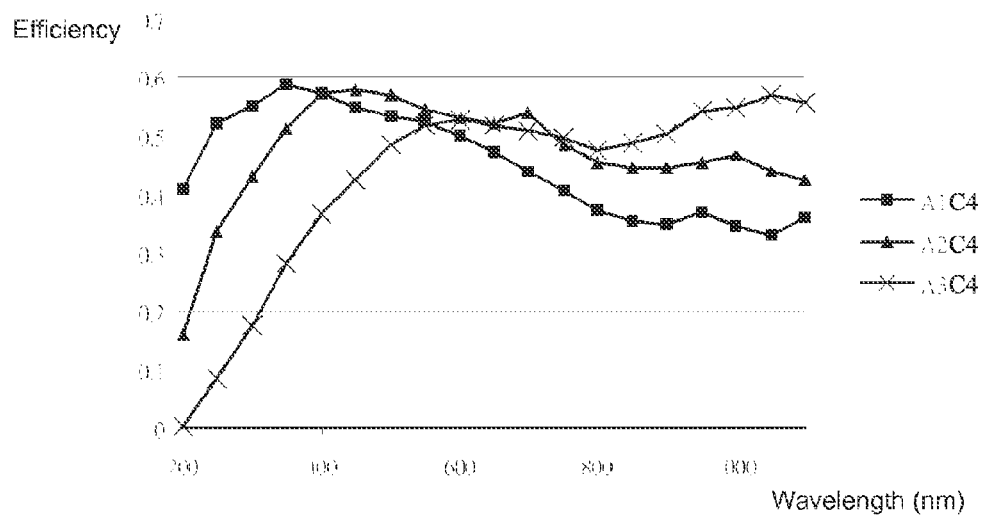
FIGS. 5D-5E are diffraction efficiency curves of each of the diffraction structures and an overall diffraction efficiency curve of a diffraction grating in accordance with the first examples of the first embodiment.
Figure 5E:
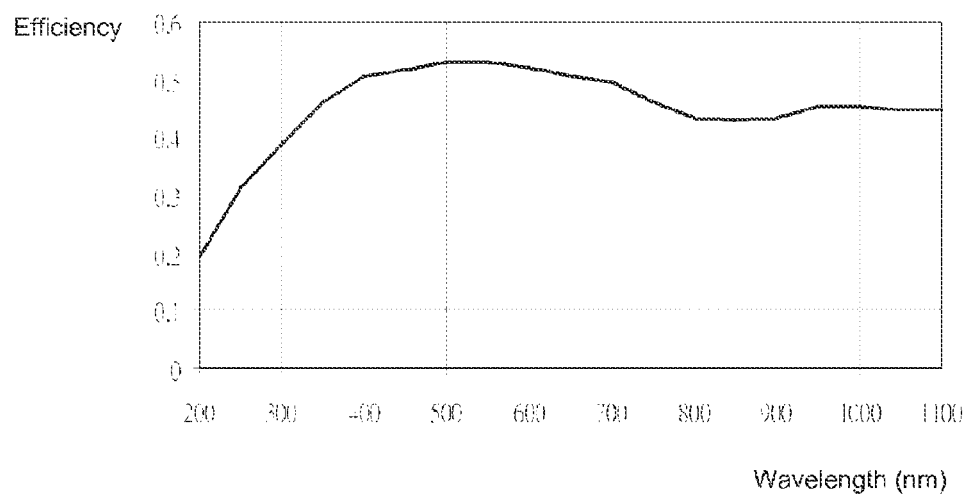

As mentioned above, a diffraction grating has a characteristic diffraction efficiency curve. In the first embodiment, as shown in FIG. 5D, the diffraction structure 101 having a blaze angle A1 has a diffraction efficiency curve A1C4, the diffraction structure 102 having a blaze angle A2 has a diffraction efficiency curve A2C4, and the diffraction structure 103 having a blaze angle A3 has a diffraction efficiency curve A3C4. The total diffraction efficiency curve of the diffraction grating 100 is shown in FIG. 5E.

Figure 5F:
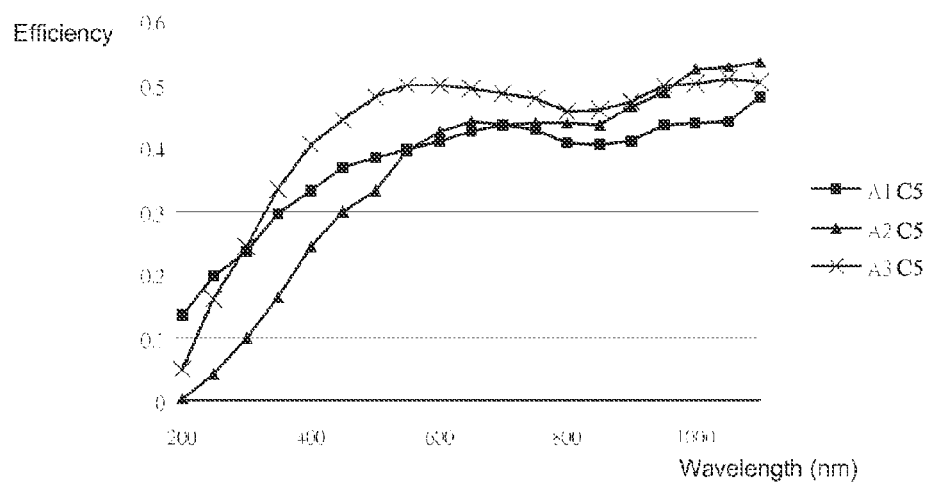
FIGS. 5F-5G are diffraction efficiency curves of each of the diffraction structures and an overall diffraction efficiency curve of a diffraction grating in accordance with the second examples of the first embodiment.
Figure 5G:
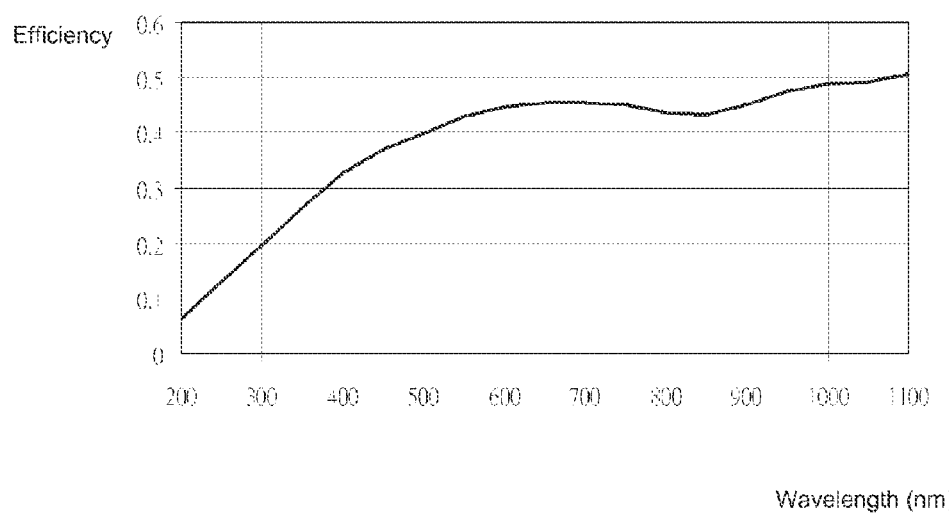

Of course, the designer can adjust the individual diffraction efficiency curve by varying the blaze angle of the corresponding diffraction structure, thus obtaining a different diffraction grating. The diffraction efficiency curve of each of the diffraction structures and the total diffraction efficiency curve of this newly designed diffraction grating are shown in FIGS. 5F and 5G, respectively. Because the designer has adjusted values of the blaze angles A1, A2, A3, the individual diffraction efficiency curves A1C5, A2C5, A3C5 shown in FIG. 5F, are respectively different from that of A1C4, A2C4, and A3C5 shown in FIG. 5D, and the total diffraction efficiency curve shown in FIG. 5G is also different from that shown in FIG. 5E. It is worth noting that the aforementioned blaze angle adjustment is performed during the design stage, because it is difficult if not impossible to vary the blaze angles once the diffraction grating is made. The designer can predetermine the diffraction efficiency curve for a diffraction grating. By using simulation software to adjust the blaze angle for each of the diffraction structures, a profile that corresponds to aforementioned predetermined diffraction efficiency curve can be obtained and used to manufacture a diffraction grating. The resulting diffraction grating will possess the predetermined diffraction efficiency curve.

FIGS. 5A to 5G depict the diffraction grating and corresponding diffraction efficiency curves. A method of manufacturing the diffraction grating of the first embodiment is described below with reference to FIGS. 6A to 6G.

Figure 6A:
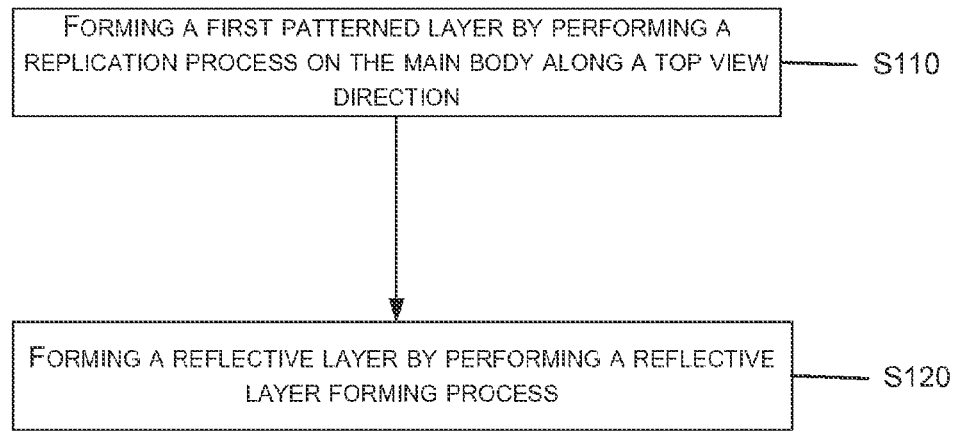
FIG. 6A is a flow diagram illustrating a method of manufacturing a diffraction grating in accordance with the first embodiment of the present disclosure.
Figure 6B:
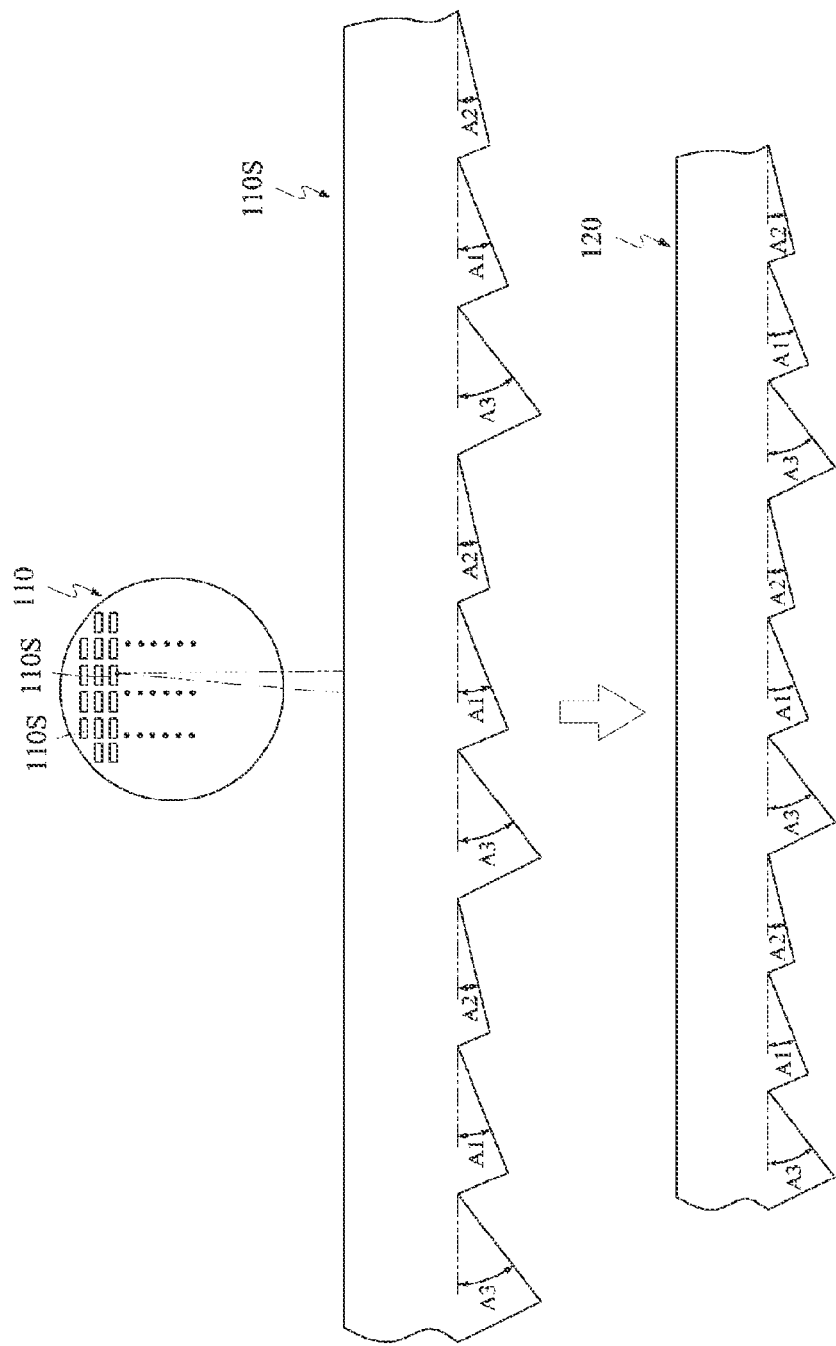
FIG. 6B is schematic diagrams of a profile and a photo mask in accordance with the first embodiment of the present disclosure.

When designing a diffraction grating, a designer can first set a predetermined diffraction curve for a diffraction grating, and then design a corresponding profile based on the predetermined diffraction curve. A photo mask can be made based on the profile and then be used to produce the diffraction grating. FIG. 6A is a flow diagram illustrating a method of manufacturing a diffraction grating in accordance with the first embodiment of the present disclosure. FIG. 6B is schematic diagrams of a profile and a photo mask in accordance with the first embodiment of the present disclosure. FIGS. 6C-6G are schematic cross-sectional views of various stages of the manufacturing a diffraction grating in accordance with the first embodiment of the present disclosure. The process used to manufacture the diffraction grating 100 in accordance with the first embodiment of the present disclosure comprises steps S110 and S120 as described below.

First, in step S110, from a direction of the top-view of the main body, a first patterned layer is formed by a reprint-molding, or replication, process based on the profile. In the first embodiment, a photo mask can be made first according to the profile, and the first patterned layer can be formed by the reprint-molding process through the photo mask. Herein, the formation of the first patterned layer is explained using a photoresist layer 140 as an example. More specifically, the profile 110 is first created by a computer program. The profile 110 may comprise an array of top-view patterns of numerous diffraction gratings (explained using 110S as an example). A top-view pattern 110S defines the blaze angle of each of the diffraction structures in the diffraction grating, as shown in FIG. 6B. In the first embodiment, the top-view pattern 110S defines three diffraction structures 101, 102, 103, in which each of the diffraction structures has a corresponding single blaze angle A1, A2, and A3, respectively. The photo mask 120 is then manufactured according to the profile 110. As shown in FIG. 6B, the photo mask 120 is scaled down proportionally with respect to the top-view pattern 110S, so that a miniaturized diffraction grating can be produced. In other embodiments, a photo mask can be produced in a 1:1, proportionally enlarged, or in a non-proportionally scaled manner. Although a profile with computer-generated patterns may be used in the first embodiment as an example, in other embodiments the profile can be a photo mask or a shadow mask.

Figure 6C:
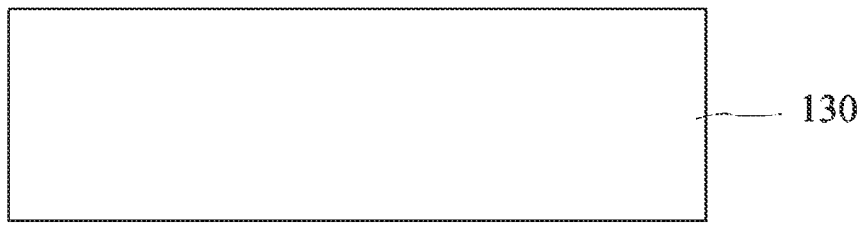
FIGS. 6C-6G are schematic cross-sectional views of various stages of manufacturing a diffraction grating in accordance with the first embodiment of the present disclosure.
Figure 6D:
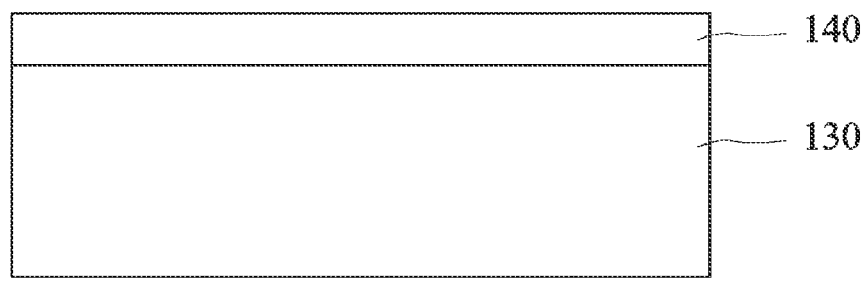
Figure 6E:
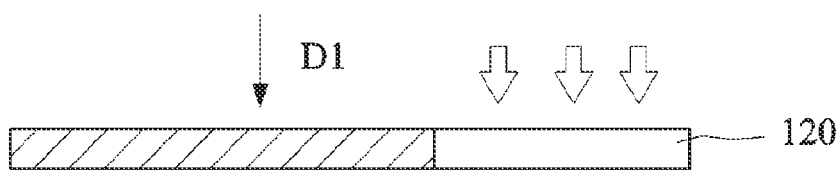
Figure 6E:
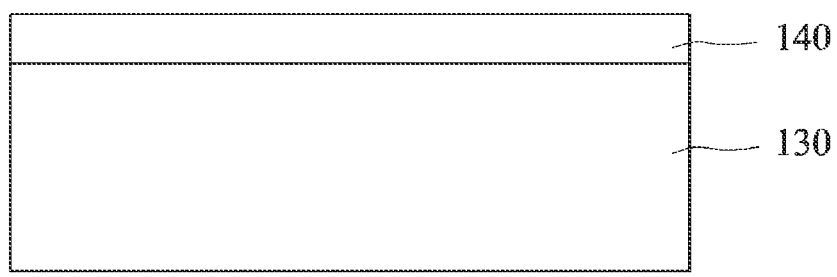
Figure 6F:
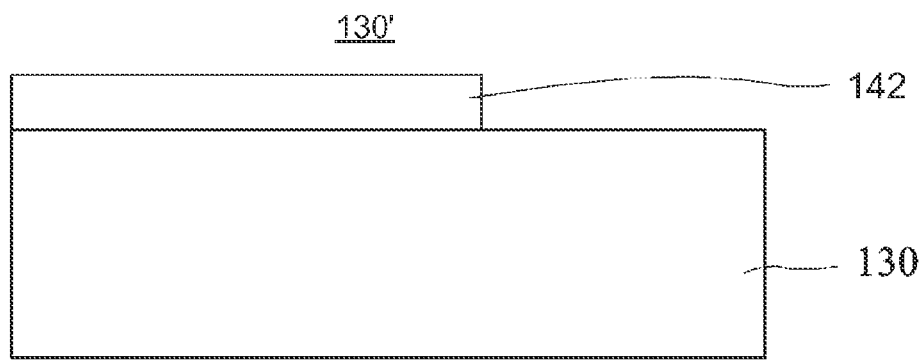

Next, as shown in FIG. 6C, a main body 130 is provided. The main body 130, for example, can be a semiconductor substrate, such as a silicon substrate. Then, a photoresist layer 140 is spread or otherwise disposed on the main body 130, as shown in FIG. 6D. The photoresist layer 140 can be made by a positive photoresist. A positive photoresist is a type of photoresist in which the portion of the photoresist that is exposed to light becomes soluble to a developer solution, while the portion that is unexposed remains insoluble. In other embodiments, a negative photoresist such as SU-8 can be used, in which case the portion of the photoresist that is exposed to light remains insoluble to the developer solution, while the portion that is unexposed to light becomes soluble. In the following photolithographic step, as shown in FIG. 6E, the photoresist layer 140 is exposed to light shined through a photo mask 120 along a top-view direction D1. Then, as shown in FIG. 6F, the exposed portion is removed by the developer solution, generating the top-view pattern 110S which corresponds to the profile 110 on the photoresist layer 140. The photoresist layer 140 containing the top-view pattern 110S is called the first patterned layer 142. The overall configuration shown in FIG. 6F is called the grating main body 130' in order to simply the following description in other embodiments.

Figure 6G:
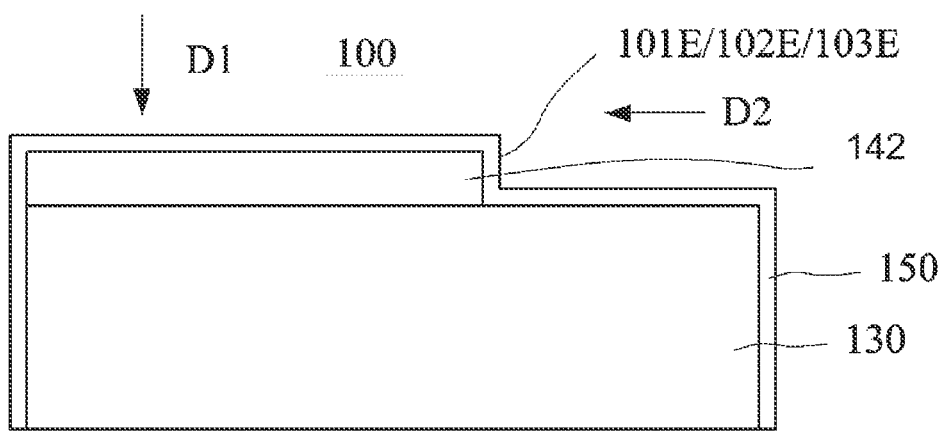

Next, referring to FIGS. 6A and 6G, at step S120, a reflective layer 150 is spread or otherwise disposed on the grating main body 130' by performing a reflective-layer-forming procedure. More specifically, a reflective layer 150 can be disposed on the first patterned layer 142 and the main body 130, thus forming a diffraction grating 100 having numerous diffraction structures 101, 102, 103. Examples of suitable materials for the reflective layer 150 include, but not limited to, aluminum. In other embodiments, one skilled in the art can use other reflective materials, such as silicon dioxide, for the reflective layer 150.

The reflective layer 150 is so thin such that structural characteristics of the first patterned layer 142 can be retained. The profile of the resulting reflective layer 150 is similar to that of the first patterned layer 142 which is similar to the profile 110. Therefore, when viewed from the top along the top-view direction D1, the reflective layer 150 exhibits the top-view pattern 110S. On the other hand, when viewed from the side of the grating main body 130' along a direction D2, the reflective layer 150 exhibits effective surfaces 101E, 102E, 103E of the diffraction structures 101, 102, 103. The top-view direction D1 is parallel to the effective surfaces 101E, 102E, 103E of the diffraction structures 101, 102, 103, respectively. The manufacturing method in accordance with the first embodiment of the present disclosure can advantageously produce numerous diffraction structures having different blaze angles at one time. Conventional approaches that use cutting tools cannot create such diffraction structures.

Accordingly, the first embodiment provides a flexible way to use a diffraction grating having various blaze angles, thus offering a flexible design. In addition, by using a profile to replicate the pattern of the diffraction grating, all of the diffraction structures can be produced at one time. By adopting photolithographic process, there is no need to use conventional diamond cutting tools. As a result, the alignment problem associated with cutting tools no longer exists since there is no need to change the cutting tools. Furthermore, since the profile corresponds to profiles of numerous diffraction gratings, it is possible to produce numerous diffraction gratings on a single wafer. Therefore, the manufacturing method of the first embodiment not only meets the demand for a flexible manufacturing process but also reduces the number of wafers used. For example, FIG. 6H is a schematic diagram of a wafer containing numerous diffraction gratings in accordance with the first embodiment of the present disclosure. Because the profile 110 shown in FIG. 6B contains top-view patterns of numerous diffraction gratings, it is possible to manufacture numerous different diffraction gratings 100 on a single wafer 100W. In addition, because existing semiconductor fabrication processes can be employed to produce different diffraction gratings, the manufacturing process can be greatly simplified, and the manufacturing cost can also be reduced.

It is worth mentioning that although the first embodiment describes a certain type of diffraction gratings and their manufacturing methods, it will be apparent to those skilled in the art that since manufacturers normally have different design requirements as to diffraction gratings and manufacturing methods, the application of the present disclosure is not limited to the type of diffraction gratings disclosed above. In other words, as long as a profile is used to define parameters of a diffraction grating and make the diffraction grating, any modifications or variations of the first embodiment are within the spirit of the present disclosure. The following example embodiments are provided so that those skilled in the art may better understand the spirit of the present disclosure and implement the present disclosure.

Second Embodiment

Figure 7:
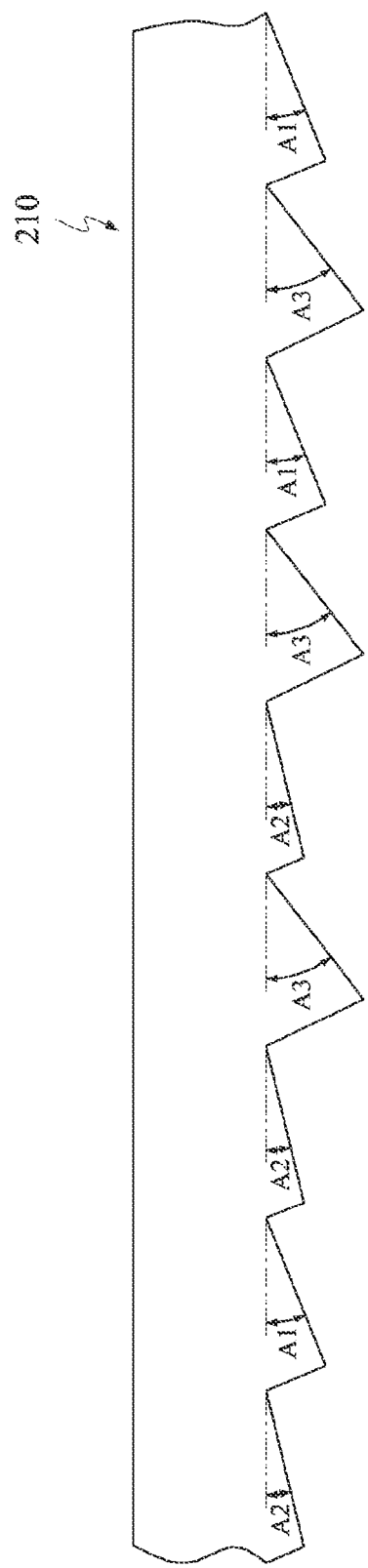
FIG. 7 is a schematic diagram of a profile in accordance with the second embodiment of the present disclosure.

Although the first embodiment uses a profile in which the diffractions structures have periodically arranged blaze angles, A3-A1-A2-A3-A1-A2-A3-A1-A2, as an example, it is not meant to limit the scope of the present disclosure. In other embodiments, those skilled in the art can vary the ordering of each of the diffraction structures according to the actual needs. For example, FIG. 7 is a schematic diagram of a profile 210 in accordance with a second embodiment of the present disclosure. As shown in FIG. 7, the ordering of the blaze angles of the profile 210 is A2-A1-A2-A3-A2-A3-A1-A3-A1 . . . , which is a non-periodic arrangement. By using the profile 210 and the manufacturing method described in the first embodiment, a diffraction grating that corresponds to the profile 210 can be produced.

In the first embodiment, the ordering of the blaze angles of the profile 110 is A3-A1-A2-A3-A1-A2-A3-A1-A2, meaning the profile 110 contains nine diffraction structures. Here, each of the three adjacent diffraction structures can be viewed as a pseudo-diffraction structure. That is, those nine diffraction structures can be viewed as three pseudo-diffraction structures. The pseudo-diffraction structures are also arranged periodically, and thus stray light will be generated. Stray light can be reduced by the non-periodic arrangement adopted in the second embodiment.

In addition, some factors, such as the incident angle and the curvature of the diffraction grating, may result in higher diffraction efficiency in the middle region of the diffraction grating. If blaze angles of the same type are concentrated in the middle section of the diffraction grating, it will cause uneven distribution of diffraction efficiencies. This problem can be solved by the non-periodic arrangement adopted in the second embodiment. The non-periodic arrangement allows an even distribution of different types of blaze angles in different sections. Therefore, by changing the profile, a designer can easily change the arrangement of the blaze angles, thus adjusting the total diffraction efficiency curve of the diffraction grating.

Third Embodiment

Figure 8:
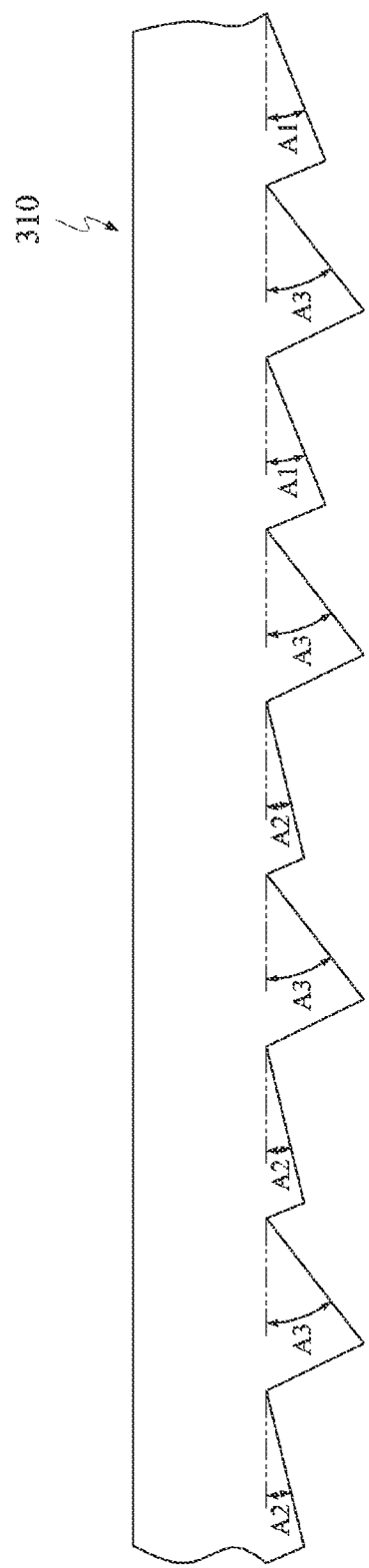
FIG. 8 is a schematic diagram of a profile in accordance with the third embodiment of the present disclosure.

Although the first embodiment uses a profile in which the diffraction structures have the same number of each type of blaze angles as an example, it is not meant to limit the scope of the present disclosure. In other embodiments, those skilled in the art can vary the total numbers of each type of the blaze angles A1, A2, A3 according to the actual needs. For example, FIG. 8 is a schematic diagram of a profile 310 in accordance with a third embodiment of the present disclosure. By using the profile 310 shown in FIG. 8 and the manufacturing method described in the first embodiment, a diffraction grating that corresponds to the pattern profile 310 can be produced. As shown in FIG. 8, in the profile 310, the total number of the blaze angle A1 is two, the total number of the blaze angle A2 is three, and the total number of the blaze angle A3 is four. In the third embodiment, since the proportion of the blaze angle A3 is the highest, the total diffraction efficiency curve of the diffraction grating looks more similar to that of the blaze angle A3. Further, since the proportion of the blaze angle A1 is the lowest, the total diffraction efficiency curve of the diffraction grating looks less similar to that of the blaze angle A1. Therefore, by changing the pattern profile, a designer can easily change the proportion of various blaze angles, thus adjusting the total diffraction efficiency curve of the diffraction grating.

Fourth Embodiment

Figure 9:
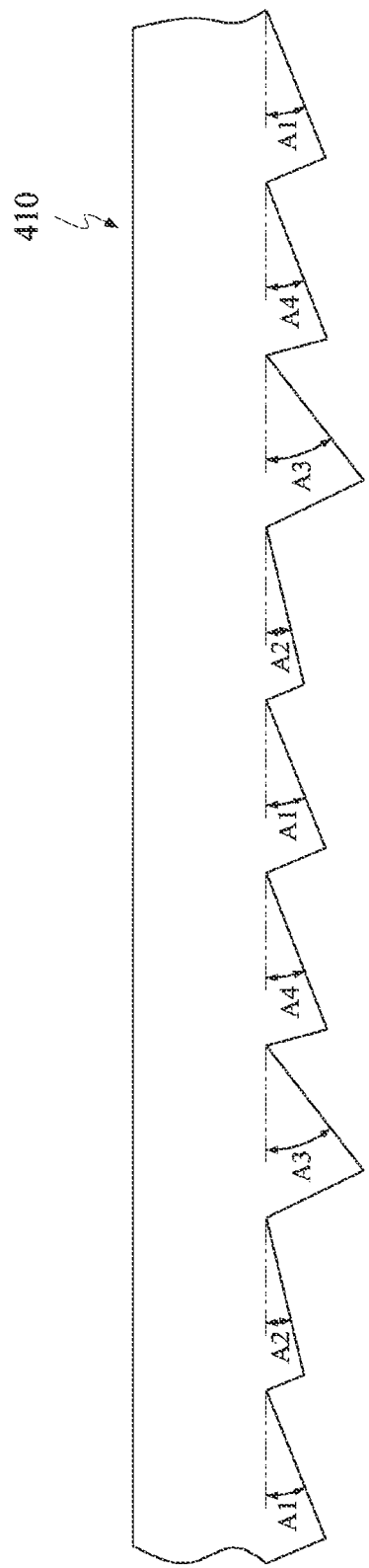
FIG. 9 is a schematic diagram of a profile in accordance with the fourth embodiment of the present disclosure.

Although the first embodiment uses a profile in which the diffraction structures have three different types of blaze angles as an example, it is not meant to limit the scope of the present disclosure. In other embodiments, those skilled in the art can vary the number of different types of blazes angles according to the actual needs. For example, FIG. 9 is a schematic diagram of a profile 410 in accordance with a fourth embodiment of the present disclosure. As shown in FIG. 9, a profile 410 contains four types of blaze angles, A1, A2, A3, A4. By using the profile 410 and the manufacturing method described in the first embodiment, a diffraction grating that corresponds to the profile 410 can be produced. In the fourth embodiment, various combinations of four types of blaze angles allow a more flexible design on the total diffraction efficiency curve of the diffraction grating. In other examples, a designer can freely combine four or more types of blaze angles to obtain more diverse total diffraction efficiency curves. Therefore, by simply varying the profile, a designer can easily achieve a variety of combinations of blaze angles for adjusting the total diffraction efficiency curve of the diffraction grating.

Fifth Embodiment

Figure 10:
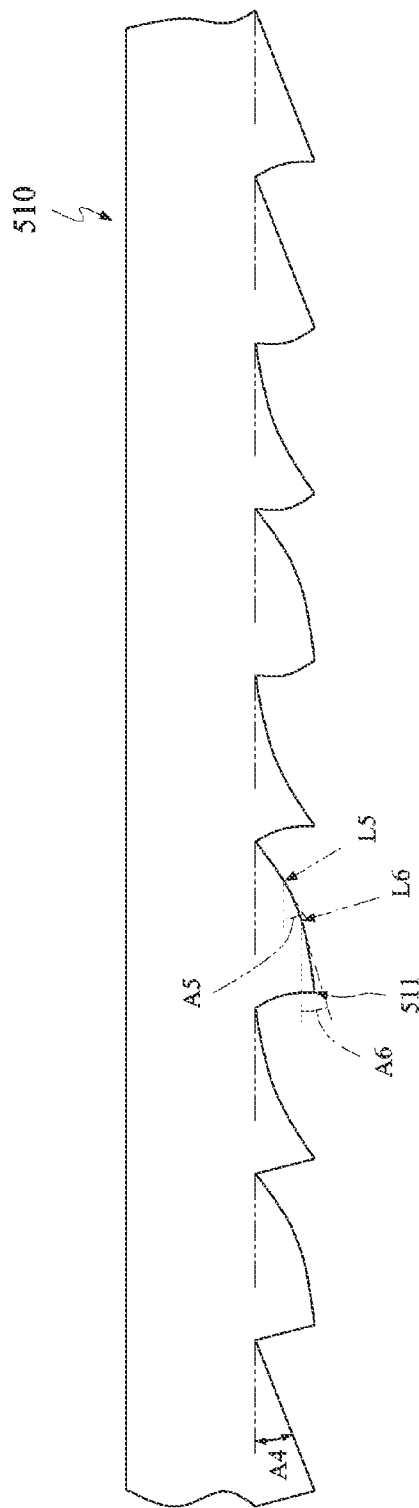
FIG. 10 is a schematic diagram of a profile in accordance with the fifth embodiment of the present disclosure.

Although the first embodiment used a profile in which a single diffraction structure has only one blaze angle as an example, it is not meant to limit the present disclosure. In other embodiments, those skilled in the art can design diffraction structures in which a single diffraction structure has a variety of blaze angles according to the actual needs. For example, FIG. 10 is a schematic diagram of a profile 510 in accordance with a fifth embodiment of the present disclosure. As shown in FIG. 10, the diffraction structures that correspond to the profile 510 include a variety of blaze angles. A diffraction structure 511 will be described below as an example.

In the diffraction structure 511, the blaze angle at L5 is A5, and the blaze angle at L6 is A6. In other words, the diffraction efficiency curve of the diffraction structure 511 constitutes the blaze angles at each position. If the blaze angle at each position is redefined, the corresponding diffraction efficiency curve of the diffraction structure 511 is also changed.

The effective surface of each of the diffraction structures in the fifth embodiment can be a convexly curved, concavely curved, or flat surface. Of course, in other embodiments, it can also be a sinusoidal curved surface, etc. By using the profile 510 and the manufacturing method described in the first embodiment, a diffraction grating that corresponds to the profile 510 can be produced. Adopting a structure that has a variety of blaze angles in a single diffraction structure allows a more flexible design on the total diffraction efficiency curve of the diffraction grating. Of course, a designer can also use combinations of these diffraction structures to fulfill the same design requirements. Therefore, by simply varying the profile, a designer can easily obtain a single diffraction structure that includes a variety of blaze angles for adjusting the total diffraction efficiency curve of the diffraction grating.

Sixth Embodiment

Figure 11A:
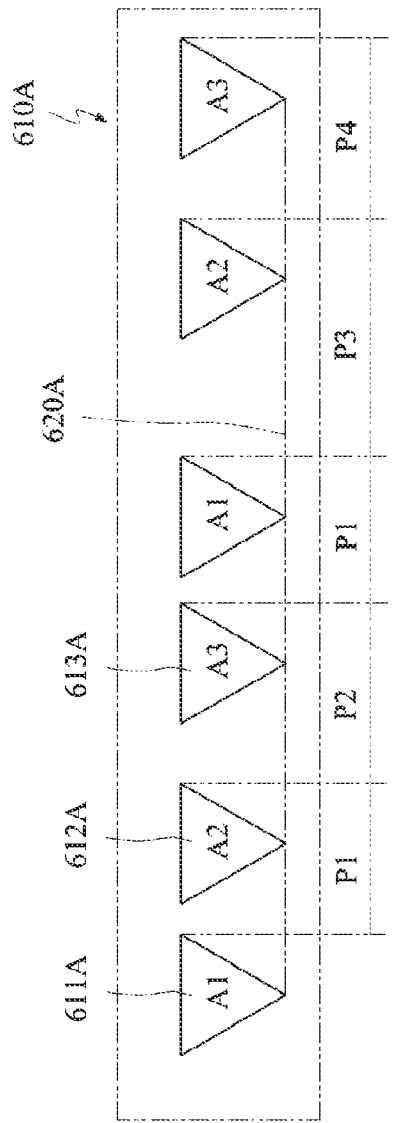
FIGS. 11A-11B are schematic diagrams of profiles in accordance with sixth embodiment of the present disclosure.
Figure 11B:
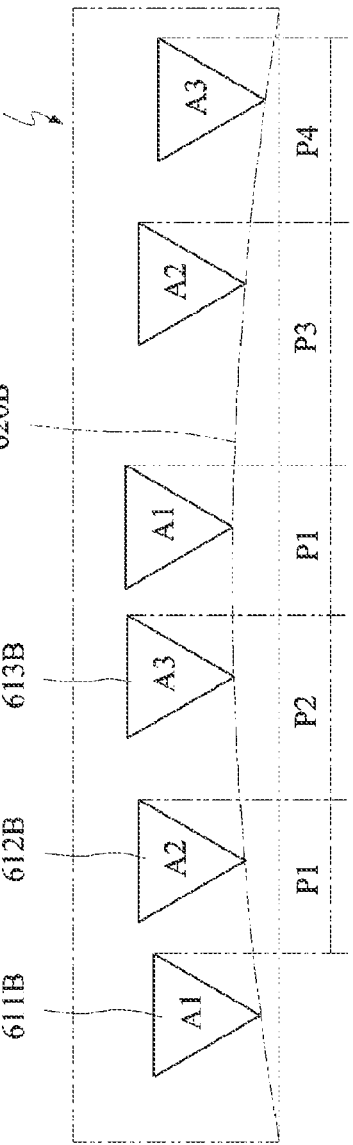

FIGS. 11A and 11B are schematic diagrams of profiles 610A and 610B, respectively, in accordance with a sixth embodiment of the present disclosure. A simplified schematic diagram is used to illustrate the arrangement of the diffraction structures in the profiles 610A, 610B of the sixth embodiment. Herein, symbol A1 inside the triangle denotes a diffraction structure having a blaze angle A1, symbol A2 inside the triangle denotes a diffraction structure having a blaze angle A2, and so forth.

Although the first embodiment uses a profile in which the diffraction structures have equal length pitches as an example, it is not meant to limit the scope of the present disclosure. In other embodiments, those skilled in the art can change the equal length pitches into unequal length pitches according to the actual needs. For example, as shown in FIG. 11A, in the first example of the sixth embodiment, the pitches of the diffraction structures 611A, 612A, 613A in the profile 610A are arranged as P1-P2-P1-P3-P4, and none of the pitches P1-P4 are set to be equal. The diffraction structures 611A, 612A, 613A are arranged along a straight line 620A. That is, the profile described above can be used to define the pitch of each of the diffraction structures. By varying the profile, a designer can adjust not only the total diffraction efficiency curve of the diffraction grating but also the pitch of each of the diffraction structures. This allows the designer to flexibly adjust the focal point of the diffracted light.

Although the first embodiment uses a profile in which the diffraction structures are arranged along a straight line as an example, it is not meant to limit the scope of the present disclosure. In other embodiments, those skilled in the art can arrange the diffraction structures along a curved line according to the actual needs. For example, as shown in FIG. 11B, in the second example of the sixth embodiment, the diffraction structures 611B, 612B, 613B of the profile 620B are arranged along a curved line 620B. Therefore, the resulting diffraction structures are arranged along a curve defined by the top-view pattern. A designer only needs change the profile to adjust the total diffraction efficiency curve of the diffraction grating. Therefore, varying the curve of the arrangement of the diffraction structures allows flexible adjustment of the focal point of the diffracted light.

In one example, when the curve 620B of the profile 610B has a curvature with a radius equal to the diameter of a Rowland circle, the diffracted light will be focused on the Rowland circle. In another example, the curve 620B of the profile 610B is not circular, thus resulting in a non-circular arrangement of the diffraction structures. By adjusting the curvature of the curve 620B in the profile 610B, the diffracted light can be focused on a straight line and be directly detected by imaging sensors of a flat-type charge-coupled device (CCD).

Figure 11C:
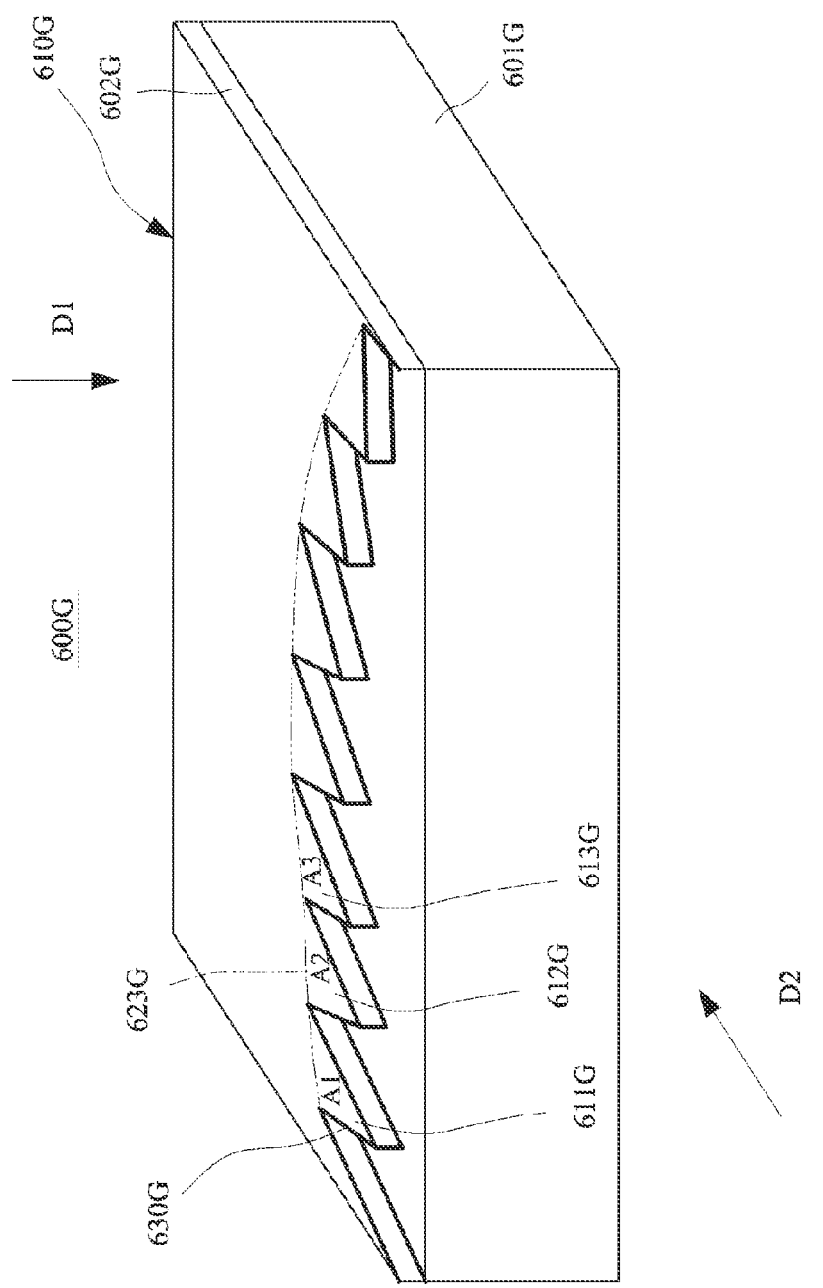
FIG. 11C is a perspective view of a diffraction grating manufactured in accordance with a profile of the sixth embodiment of the present disclosure.

FIG. 11C is a perspective view of a diffraction grating 600G produced in accordance with the profile 610B of the sixth embodiment of the present disclosure. As shown in FIG. 11C, the diffraction grating 600G comprises a grating main body 610G and a reflective layer 630G. The grating main body 610G comprises a first patterned layer 602G. The first patterned layer 602G contains numerous diffraction structures 611G, 612G, 613G disposed on a silicon substrate 601G. When viewed from the top of the grating main body 610G along a top-view direction D1, the diffraction structures 611G, 612G, 613G are arranged in a pattern defined by the corresponding profile 610B shown in FIG. 11B, and thus are arranged along a curve 623G. The profile 610B also defines blaze angles A1, A2, A3 of the diffraction structures 611G, 612G, 613G, respectively. A reflective layer 630G is disposed on the diffraction structures 611G, 612G, 613G, possessing characteristics of the diffraction structures 611G, 612G, 613G. The blaze angles of the diffraction structure 611G, 612G, 613G are A1, A2, A3, respectively. The three types of blaze angles correspond to those in the profile 610B shown in FIG. 11B.

In the sixth embodiment, the focal point of the diffracted light can be easily adjusted by modifying the pitch and the curvature. The various possible combinations of these two parameters allow a more flexible design of the focal point. It is worth mentioning that these two parameters can also be defined in the profile together. In other words, by changing the profile, a designer can adjust not only the total diffraction efficiency curve of the diffraction grating but also the focal point of the diffracted light.

Seventh Embodiment

Figure 12:
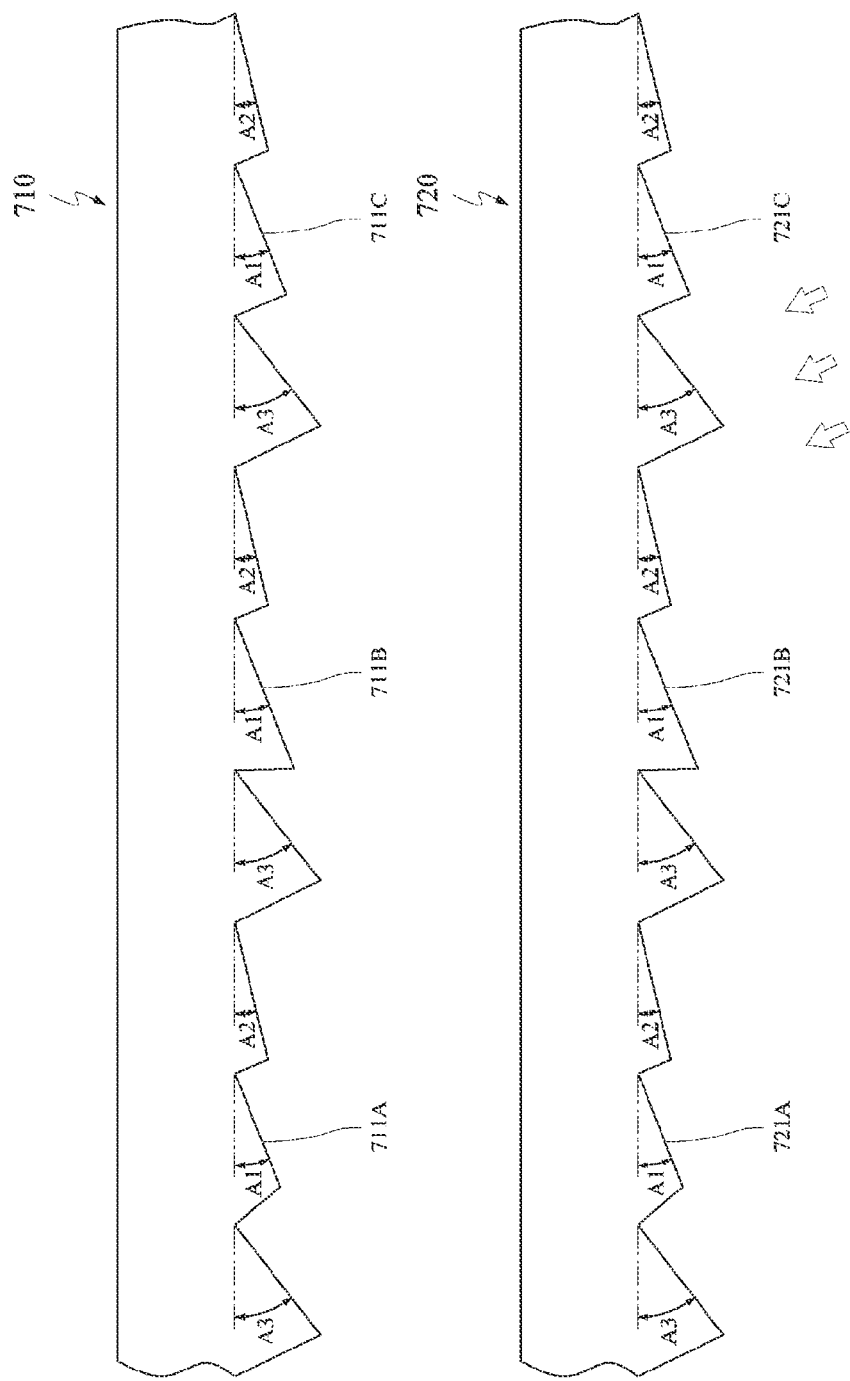
FIG. 12 is schematic diagrams of a profile and a corresponding diffraction grating.

Although the first embodiment uses a profile containing diffraction structures in which effective surfaces of the same type of diffraction structures have the equal length as an example, it is not meant to limit the scope of the present disclosure. In other embodiments, those skilled in the art can change the lengths of the effective surfaces of the same type of diffraction structures according to the actual needs. For example, FIG. 12 shows a schematic diagram of a profile 710 and a schematic diagram of a corresponding diffraction grating 720. The hollow arrows indicate the direction of an incident light. By using the profile 710 and the manufacturing method described in the first embodiment, the diffraction grating 720 which corresponds to the profile 710 can be produced. As shown in FIG. 12, the lengths of the effective surfaces of the diffraction structures in the profile 710 are adjusted as follows: the length of the effective surface 711A is shorter than that of the effective surface 711C, while the length of the effective surface 711B is longer than that of the effective surface 711C. Therefore, in the diffraction grating 720, the shorter length of the effective surface 711A with respect to that of the effective surface 711C reduces the energy of the diffracted light, while the longer length of the effective surface 711B with respect to that of the effective surface 711C increases the energy of the diffracted light. Since the lengths of the effective surfaces of the diffraction structures are not equal, a designer can change the profile to adjust the total diffraction efficiency curve of the diffraction grating and the energy distribution curve of the diffracted light.

Accordingly, by changing the profile, various parameters of a diffraction grating can be adjusted simultaneously to meet the design requirements. A designer can adjust various parameters through simulation software to obtain a desirable profile, and to make a diffraction grating having diffraction structures that correspond to the simulated profile.

Eighth Embodiment

Figure 13A:
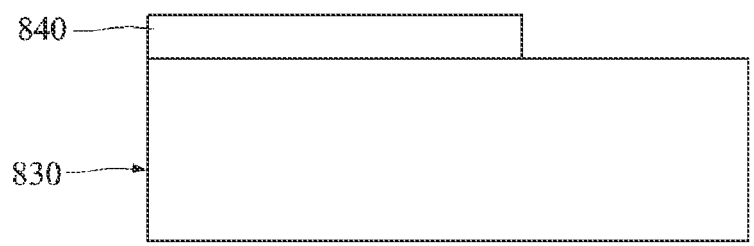
FIGS. 13A-13C are schematic cross-sectional views of various stages of manufacturing a diffraction grating in accordance with the eight embodiment of the present disclosure.
Figure 13B:
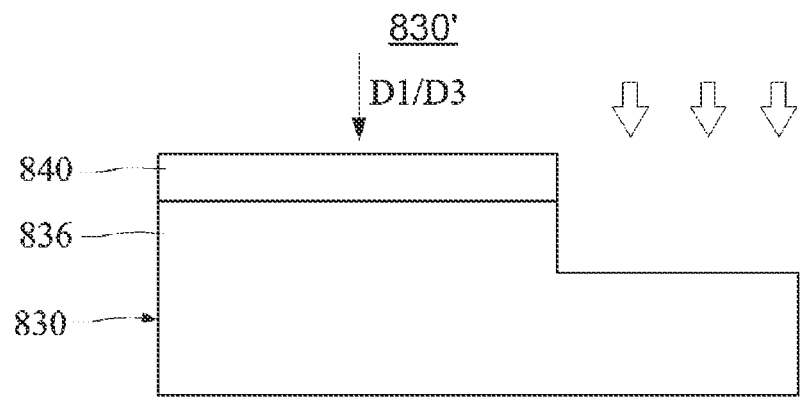
Figure 13C:
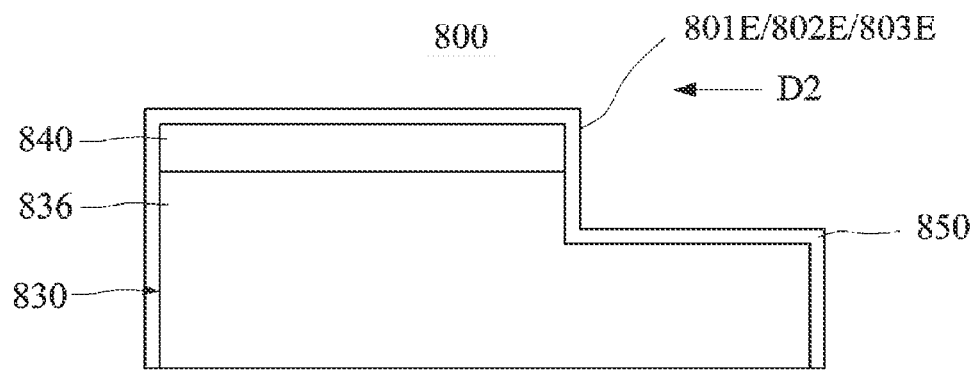

Although the first embodiment uses a photolithographic process as an example to manufacture the diffraction grating, it is not meant to limit the scope of the present disclosure. In other embodiments, those skilled in the art can use other methods to manufacture the diffraction grating according to the actual needs. For example, FIGS. 13A-13C are schematic cross-sectional views of various stages of manufacturing a diffraction grating 800 in accordance with an eight embodiment of the present disclosure. The process of the eighth embodiment is similar to that of the first embodiment, except that after the first patterned layer (the photoresist layer) 840 is formed on the semiconductor main body 830, as shown in FIG. 13A, a deep semiconductor etching process is performed on the semiconductor main body 830 (the reprint-molding, or replication, process includes a particle etching process) through the first patterned layer 840 along an etching direction D3 to provide a second patterned layer 836, as shown in FIG. 13B (the overall configuration of FIG. 13B is herein referred to as a grating main body 830'). A reflective layer 850 is then disposed on the grating main body 830'. Therefore, in the eighth embodiment the process of forming the reflective layer comprises the following steps. First, the second patterned layer 836 is formed underneath the first patterned layer (the photoresist layer) 840 through the first patterned layer (the photoresist layer) 840. Then, the reflective layer 850 is disposed on the first patterned layer (the photoresist layer) 840 and the second patterned layer 836 to obtain the diffraction grating 800 having effective surfaces 801E, 802E, 803E. The etching direction D3 is parallel to the effective surfaces 801E, 802E, 803E.

Therefore, the diffraction structures manufactured in accordance with the manufacturing method of the eighth embodiment comprise a first patterned layer (the photoresist layer) 840 and a second patterned layer (silicon layer) 836. The first patterned layer 840 is in direct contact with the reflective layer 850, having characteristics that are directly or indirectly defined by the profile described above. The second patterned layer 836 is located underneath the first patterned layer 840 and is in direct contact with the reflective layer 850. The second patterned layer 836 has characteristics that correspond to those of the first patterned layer 840.

This configuration increases the heights of the effective surface 801E, 802E, 803E of the diffraction structures as well as the energy of the diffracted light, thus improving the signal quality. Therefore, the grating main body 830' in the eighth embodiment is a product of the semiconductor etching process. In addition, the effective surfaces 801E, 802E, 803E of the diffraction structures lie parallel to both the etching direction D3 and the top-view direction D1.

Ninth Embodiment

Figure 14A:
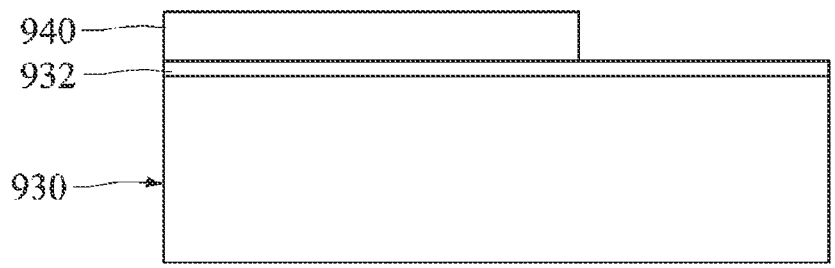
FIGS. 14A-14E are schematic cross-sectional views of various stages of manufacturing a diffraction grating in accordance with the ninth embodiment of the present disclosure.
Figure 14B:
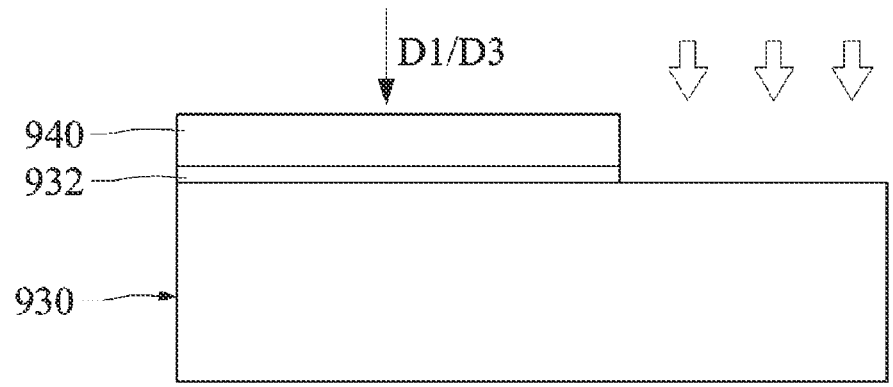
Figure 14C:
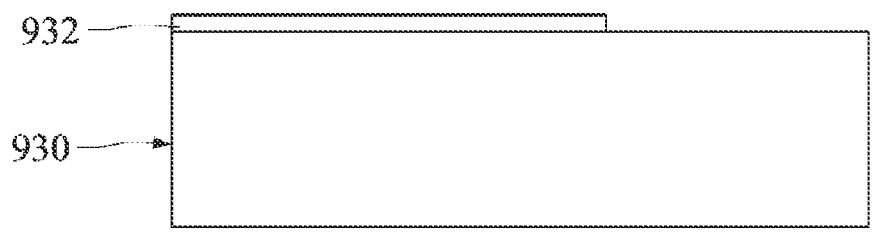
Figure 14D:
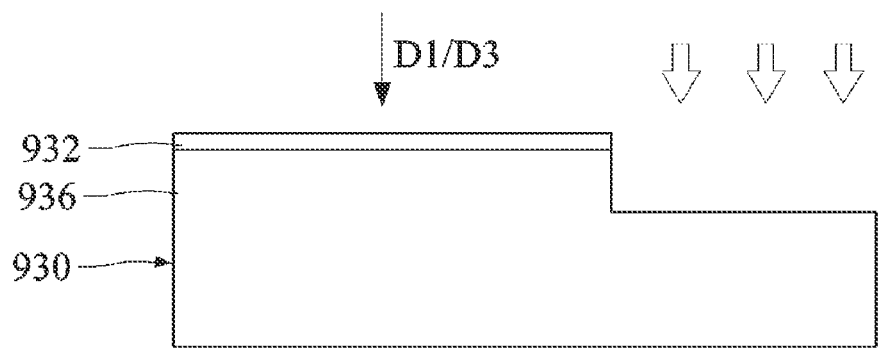
Figure 14E:
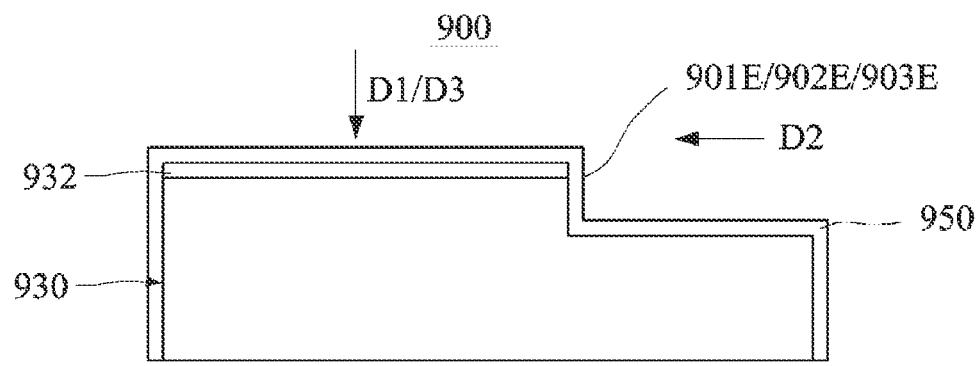

Although the first embodiment uses a photolithographic process as an example to manufacture the diffraction grating, it is not meant to limit the scope of the present disclosure. In other embodiments, those skilled in the art can use other methods to manufacture the diffraction grating according to the actual needs. For example, FIGS. 14A-14E are schematic cross-sectional views of various stages of manufacturing a diffraction grating 900 in accordance with a ninth embodiment of the present disclosure. The ninth embodiment is similar to the first embodiment, except that in the ninth embodiment, the main body 930 is a silicon substrate having a silicon dioxide layer 932 formed on the main body 930. Thus, a first patterned layer (the photoresist layer) 940 having the defined pattern is disposed on the silicon dioxide layer 932 of the main body 930, as shown in FIG. 14A. Then, as shown in FIG. 14B, through the pattern of the first patterned layer (the photoresist layer) 940, the silicon dioxide layer 932 is etched along an etching direction D3 to generate the pattern on the silicon dioxide layer 932. The first patterned layer (the photoresist layer) 940 is removed subsequently, as shown in FIG. 14C. Then, as shown in FIG. 14D, through the pattern defined on the silicon dioxide layer 932, the main body 930 is deep-etched along the etching direction D3 to provide the second patterned layer 936. The overall configuration of FIG. 14D is herein referred to as a grating main body. Finally, as shown in FIG. 14E, the reflective layer 950 is disposed on the silicon dioxide layer 932 and the main body 930 to provide the diffraction grating 900. The diffraction structures of the diffraction grating 900 have effective surfaces 901E, 902E, 903E. In the ninth embodiment, because the silicon dioxide layer 932 possesses better resistance to the etching than does the photoresist layer, a deeper etching on the main body 930 (the silicon substrate) is feasible.

Tenth Embodiment

Figure 15A:
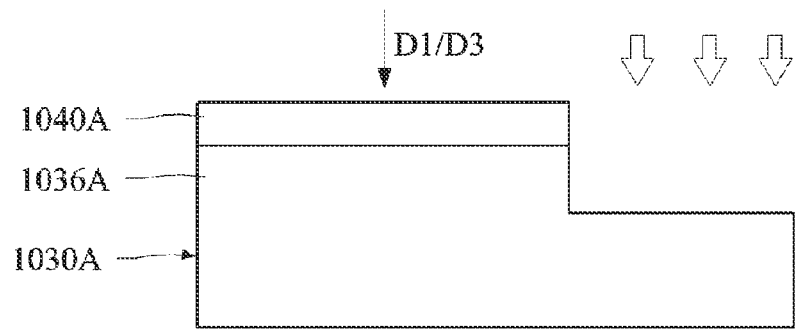
FIGS. 15A-15C are schematic cross-sectional views of various stages of manufacturing a diffraction grating in accordance with the first example of the tenth embodiment of the present disclosure.
Figure 15B:
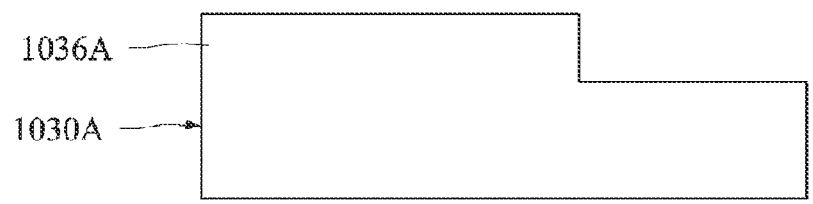
Figure 15C:
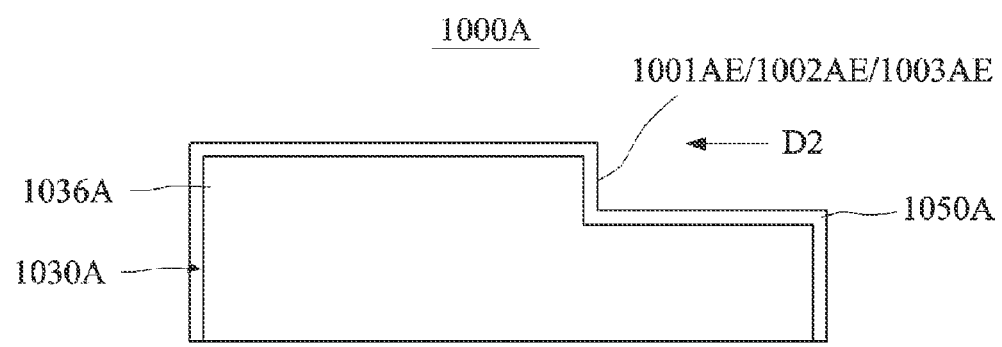

In the eighth embodiment, the reflecting layer 850 is in direct contact with both the first patterned layer 840 and the second patterned layer 836, thus the height of the effective surfaces can be viewed as the total thickness of the first patterned layer 840 and the second patterned layer 836. However, it is given as an example and does not limit the scope of the present disclosure. In other embodiments, those skilled in the art may use only one patterned layer as the height of the effective surfaces to avoid the generation of stray light due to discontinuity between multiple layers. For example, FIGS. 15A-15C are schematic cross-sectional views of various stages of manufacturing a diffraction grating 1000A in accordance with a first example of a tenth embodiment of the present disclosure. The process of first example of the tenth embodiment is very similar to that of the eighth embodiment, except that: after forming a second patterned layer 1036A by etching the main body 1030A along an etching direction D3 through the first patterned layer (the photoresist layer) 1040A having the defined pattern (shown in FIG. 15A), the first patterned layer (the photoresist layer) 1040A is removed, as shown in FIG. 15B. The overall configuration shown in FIG. 15B is herein referred to as a grating main body. Then, the reflective layer 1050A is disposed on the main body 1030A and the second patterned layer 1036A to provide the diffraction grating 1000A having effective surfaces 1001AE, 1002AE, 1003AE.

Therefore, in the manufacturing method of the first example of the tenth embodiment, the process of forming a reflective layer in the diffraction grating comprises: first forming the second patterned layer 1036A underneath the first patterned layer 1040A through the first patterned layer 1040A; then removing the first patterned layer 1040A; and finally, disposing the reflective layer 1050A on the second patterned layer 1036A.

The diffraction grating 1000A obtained according to the manufacturing method illustrated in the first example of the tenth embodiment comprises a second patterned layer 1036A. The second patterned layer 1036A is in contact with the reflective layer 1050A, and is defined directly or indirectly by the profile to generate corresponding features. In the tenth embodiment, the reflective layer is formed and evenly distributed on the surface of the silicon substrate. As a result, the discontinuity of the multilayer structure and the resulting stray light can be reduced.

Figure 16A:
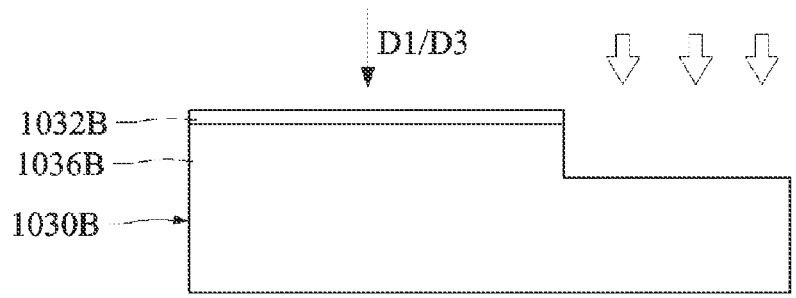
FIGS. 16A-16C are schematic cross-sectional views of various stages of manufacturing a diffraction grating 1000B in accordance with the second example of the tenth embodiment of the present disclosure.
Figure 16B:
Figure 16C:
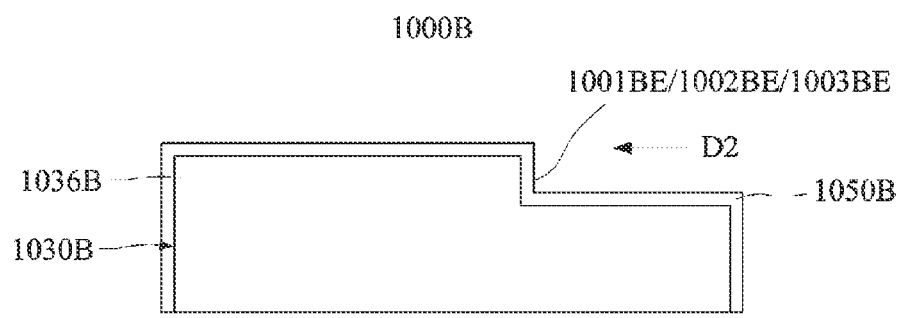

As another example, FIGS. 16A-16C are schematic cross-sectional views of various stages of manufacturing a diffraction grating 1000B in accordance with a second example of the tenth embodiment of the present disclosure. The process of the second example of the tenth embodiment is similar to that of the ninth embodiment, except the following: after forming the second patterned layer 1036B by etching the main body 1030B along an etching direction D3 through the silicon dioxide layer 1032B having the defined pattern (shown in FIG. 16A), the silicon dioxide layer 1032B is removed, as shown in FIG. 16B. The overall configuration shown in FIG. 16B is herein referred to as a grating main body. The reflective layer 1050B is then disposed on the main body 1030B and the second patterned layer 1036B to provide the diffraction grating 1000B having effective surfaces 1001BE, 1002BE, 1003BE, as shown in FIG. 16C. The resulting diffraction grating exhibits effects similar to that disclosed in the first example of the tenth embodiment.

Eleventh Embodiment

Figure 17A:
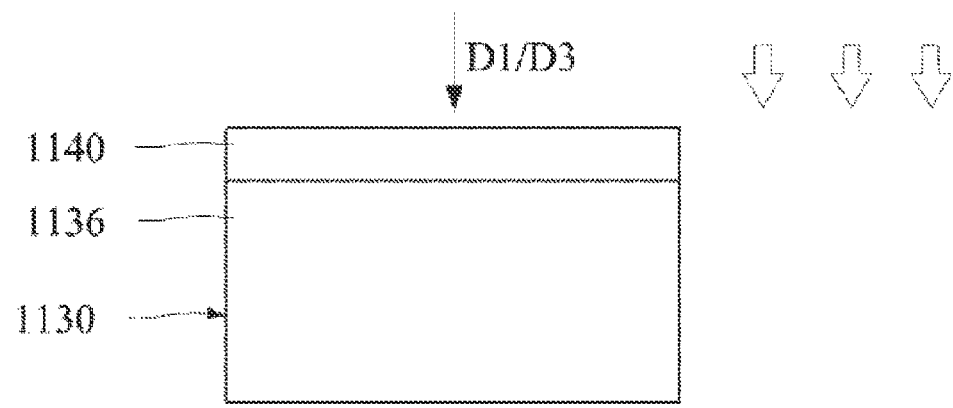
FIGS. 17A-17B are cross-sectional views of various stages of manufacturing a diffraction grating in accordance with the eleventh embodiment of the present disclosure.
Figure 17B:
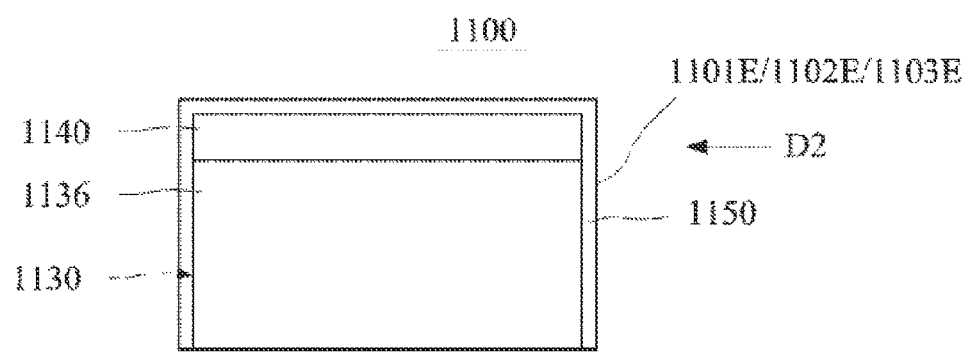

Although the eighth embodiment uses a deep etching process as an example to perform the etching on the main body 830, it is not meant to limit the scope of the present disclosure. In other embodiments, those skilled in the art may etch the main body 830 more deeply or repeat the deep etching procedure several times in order to fully utilize the height of the main body 830. For example, FIGS. 17A-17B are cross-sectional views of various stages of manufacturing a diffraction grating 1100 in accordance with an eleventh embodiment of the present disclosure. The manufacturing method of the eleventh embodiment is similar to that of the eighth embodiment, except that the second patterned layer 1136 is formed by etching the main body 1130 along an etching direction D3 through the first patterned layer 1140, as shown in FIG. 17A. The reflective layer 1150 is then disposed on the first patterned layer 1140 and the main body 1130 to provide the diffraction grating 1100 having effective surfaces 1101E, 1102E, 1103E. The method disclosed in the eleventh embodiment allows a more effectively use of the main body, thus miniaturizing the size and reducing non-functional portions of the diffraction grating to facilitate the integration of the diffraction grating with other instruments.

Twelfth Embodiment

Figure 18:
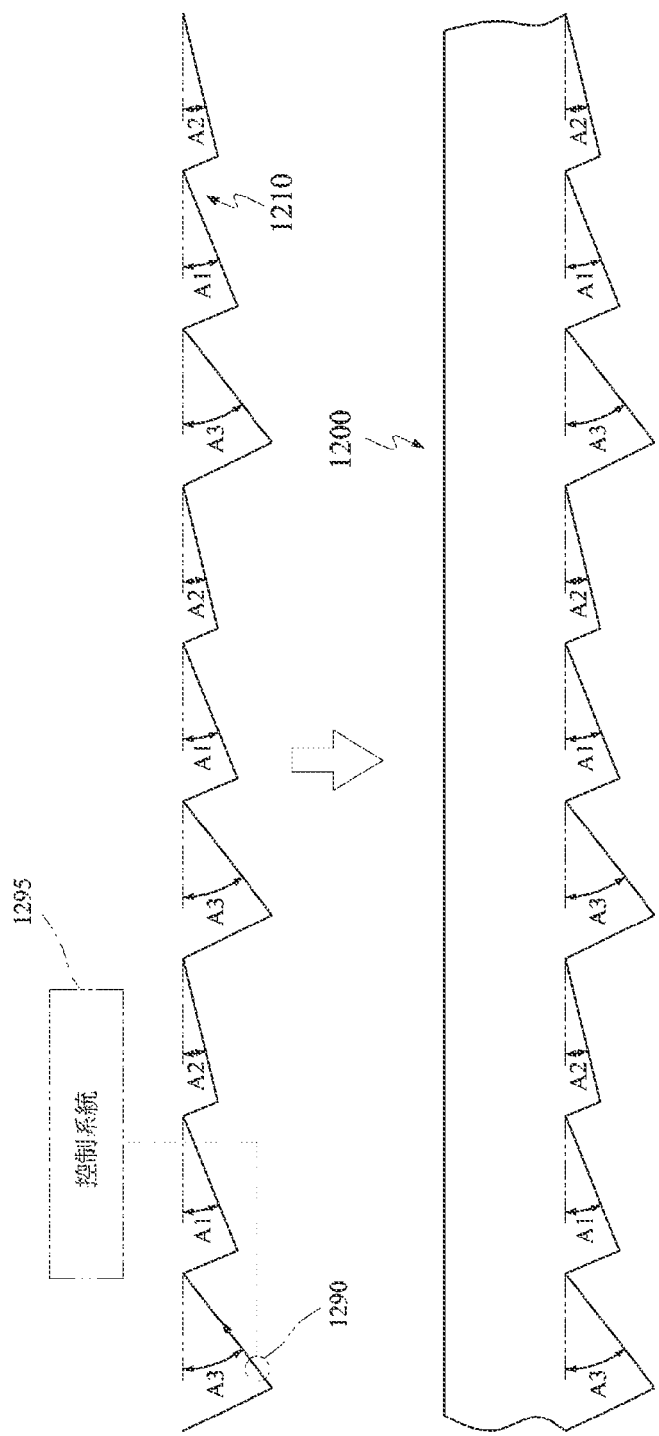
FIG. 18 is schematic diagrams illustrating a method of manufacturing a diffraction grating in accordance with the twelfth embodiment of the present disclosure.

Although the first embodiment uses a profile containing a top-view pattern of the diffraction grating as an example, it is not meant to limit the scope of the present disclosure. In other embodiments, those skilled in the art can use other patterns as the profile according to the actual needs. For example, FIG. 18 shows schematic diagrams illustrating the method of manufacturing a diffraction grating 1200 in accordance with a twelfth embodiment of the present disclosure. As shown in FIG. 18, the twelfth embodiment adopts a moving path, for example, the moving path of a laser beam in laser cutting equipment 1290, as the profile 1210. Controlled by a control system 1295, a laser beam of the laser cutting machine 1290 cuts a substrate along the moving path, producing the diffraction grating 1200 having various blaze angles A1, A2, A3. The emission direction of the laser beam is perpendicular to the movement plane of the laser cutting equipment 1290 and is parallel to effective surfaces of the diffraction grating 1200. In the twelfth embodiment, parameters of the diffraction grating, such as curvature, pitches, and blaze angles, can be defined by the moving path. The diffraction grating can be manufactured based on the moving path. There is no need to replace the cutting tool during the manufacturing process, thus no alignment problem will occur. This approach can achieve similar effects as those describe above.

Thirteenth Embodiment

Although the twelfth embodiment uses laser cutting equipment as an example, it does not limit the scope of the present disclosure. In other embodiments, those skilled in the art can change the type of the cutting tools according to the actual needs. For example, a process of the thirteenth embodiment is similar to that of the twelfth embodiment, except that an ion beam with a much smaller focal point is employed to cut the substrate to afford diffraction gratings with higher resolution. In other embodiments, an electron beam (e-beam) can be employed to cut the substrate to afford diffraction gratings with much higher resolution.

Fourteenth Embodiment

Figure 19A:
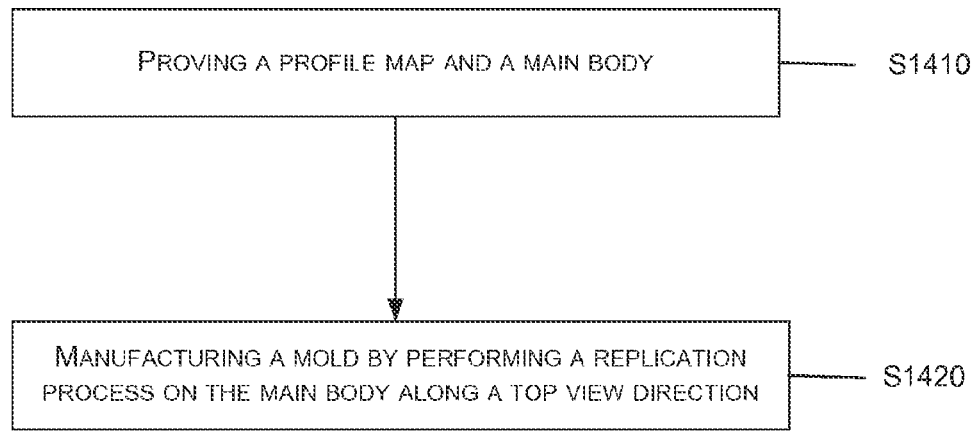
FIG. 19A is a flow diagram illustrating a method of producing a master grating in accordance with the fourteenth embodiment of the present disclosure.
Figure 19B:
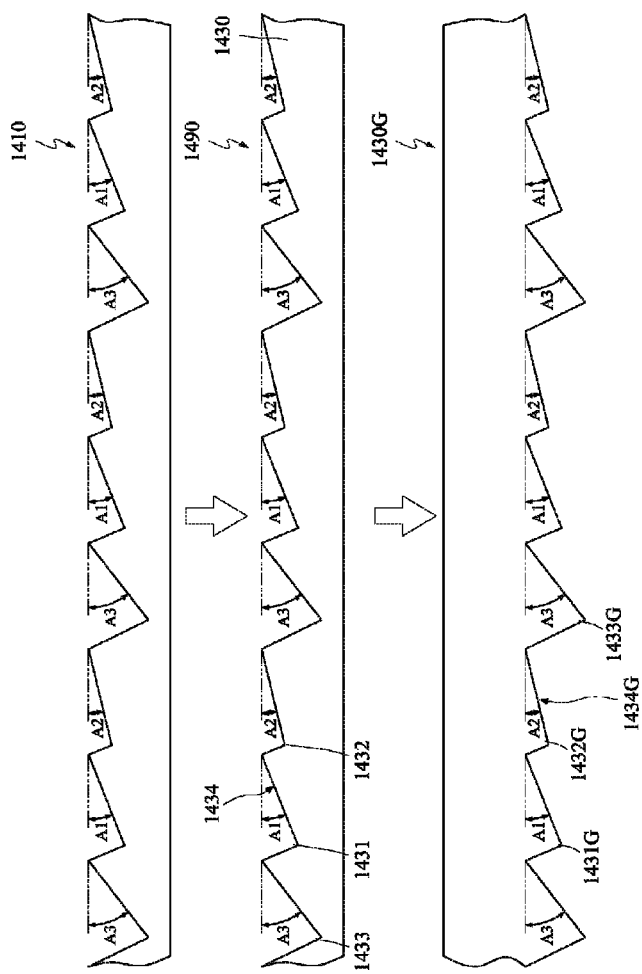
FIG. 19B is schematic diagrams illustrating a method of manufacturing a diffraction grating in accordance with the fourteenth embodiment of the present disclosure.
Figure 19C:
FIGS. 19C-19H are schematic cross-sectional views of various stages of manufacturing a diffraction grating in accordance with the fourteenth embodiment of the present disclosure.

Although the first embodiment uses a photolithographic process as an example to manufacture the diffraction grating, it does not limit the scope of the present disclosure. In other embodiments, those skilled in the art can use other manufacturing methods according to the actual needs. For example, a mold can be made first, and then the diffraction grating can be replicated from the mold. FIG. 19A is a flow diagram illustrating a method of producing a mold 1490 in accordance with a fourteenth embodiment of the present disclosure. FIG. 19B shows schematic diagrams illustrating a method of manufacturing a diffraction grating 1400 in accordance with the fourteenth embodiment of the present disclosure. FIGS. 19C-19H are schematic cross-sectional views of various stages of manufacturing a diffraction grating 1400 in accordance with the fourteenth embodiment of the present disclosure.

Figure 19D:
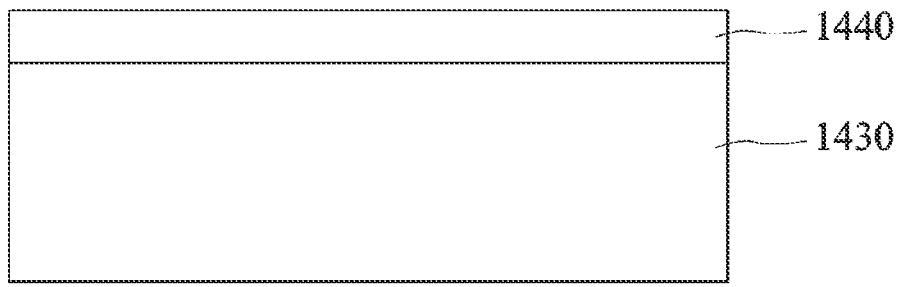
Figure 19E:
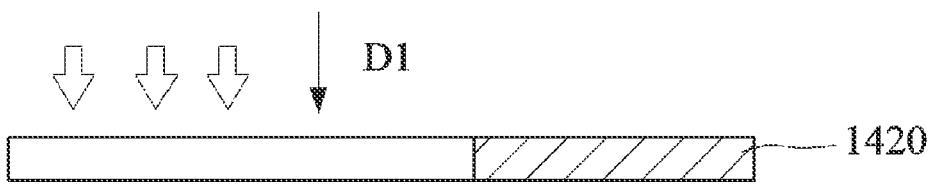
Figure 19E:
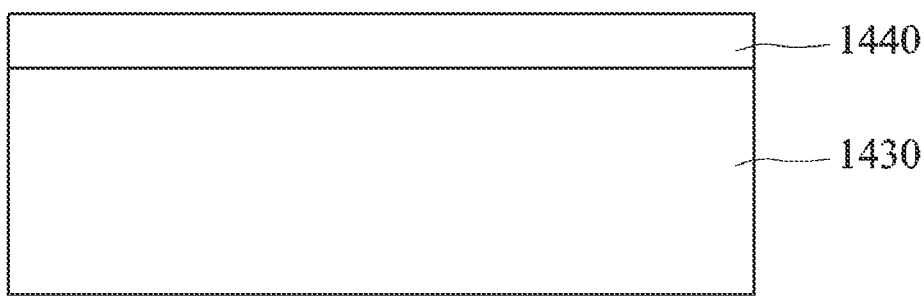
Figure 19F:
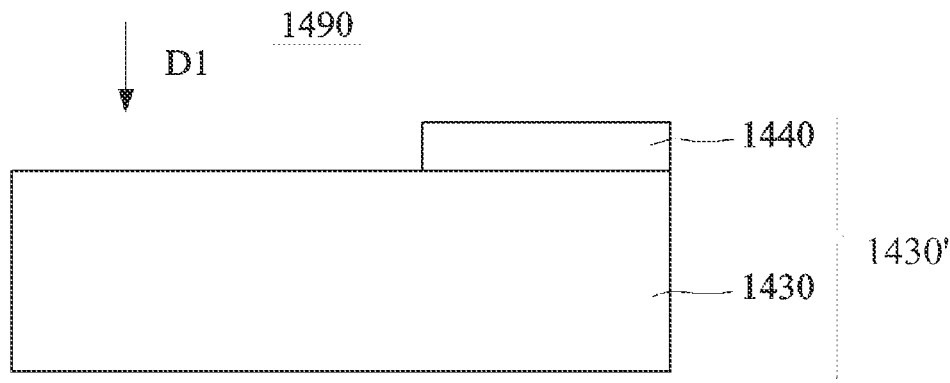
Figure 19G:
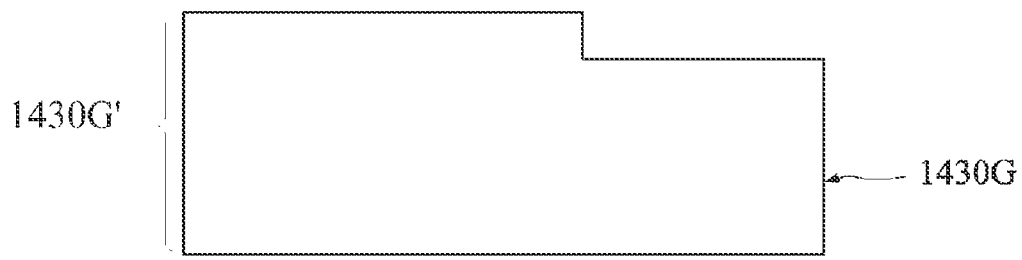
Figure 19H:
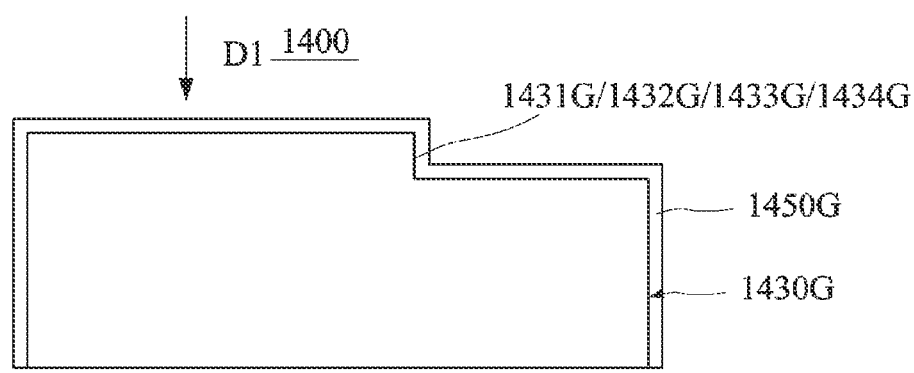

As shown in FIGS. 19A to 19H, a method of manufacturing a mold of the fourteenth embodiment comprises the following steps. First, at step S1410, a profile 1410 (FIG. 19B) and a main body 1430 (FIG. 19C) are provided. Then, at step S1420, a reprint-molding, or replication, process is performed on the main body 1430 along a top-view direction D1 based on the profile 1410 to afford the mold 1490. Detailed procedure of the reprint-molding process is similar to that described in the first embodiment. As shown in FIG. 19D, the photoresist layer 1440 is first disposed on the main body 1430. Then, using a photo mask 1420 obtained based on the profile 1410, as shown in FIG. 19E, the mold 1490 (shown in FIG. 19F) is produced by the photolithographic process. Since the procedure is similar to that described in the first embodiment, no detailed description is provided here in the interest of brevity. Afterwards, as shown in FIG. 19G, the reprint-molding process is performed to replicate the mold 1490 on another main body 1430G. Finally, the reflective layer 1450G is disposed on the diffraction structures 1431G, 1432G, 1433G, as shown in FIG. 19H.

As to the configuration of the diffraction grating 1400, the diffraction grating 1400 comprises a grating main body 1430G'. The grating main body 1430G' comprises numerous diffraction structures 1431G, 1432G, 1433G (FIG. 19B, the solid part). The profile 1410 contains a top-view pattern 1434G of the diffraction structures 1431G, 1432G, 1433G. The top-view pattern 1434G defines various blaze angles A1, A2, A3 of the diffraction structures 1431G, 1432G, 1433G, as shown in FIG. 19B.

As to the configuration of the mold 1490, the mold 1490 comprises a grating main body 1430' (see FIGS. 19B and 19F). The grating main body 1430' comprises numerous diffraction structures (FIG. 19B, the hollow portion) 1431, 1432, 1433. Viewed from the top of the grating main body 1430 along the top-view direction D1, the diffraction structures 1431, 1432, 1433 are arranged in a pattern 1434 which is defined by the corresponding profile 1410. This profile 1410 also defines blaze angles A1, A2, A3 of diffraction structures 1431, 1432, 1433. The mold 1490 provided in the fourteenth embodiment can be used to replicate the diffraction grating 1400. A large number of the mold 1490 can be produced by the manufacturing method in accordance with the fourteenth embodiment, and the mold 1490 can also be repeatedly used for the mass production of diffraction gratings. Thus, the manufacturing method in accordance with the fourteenth embodiment can advantageously reduce the manufacturing cost.

Fifteenth Embodiment

Figure 19I:
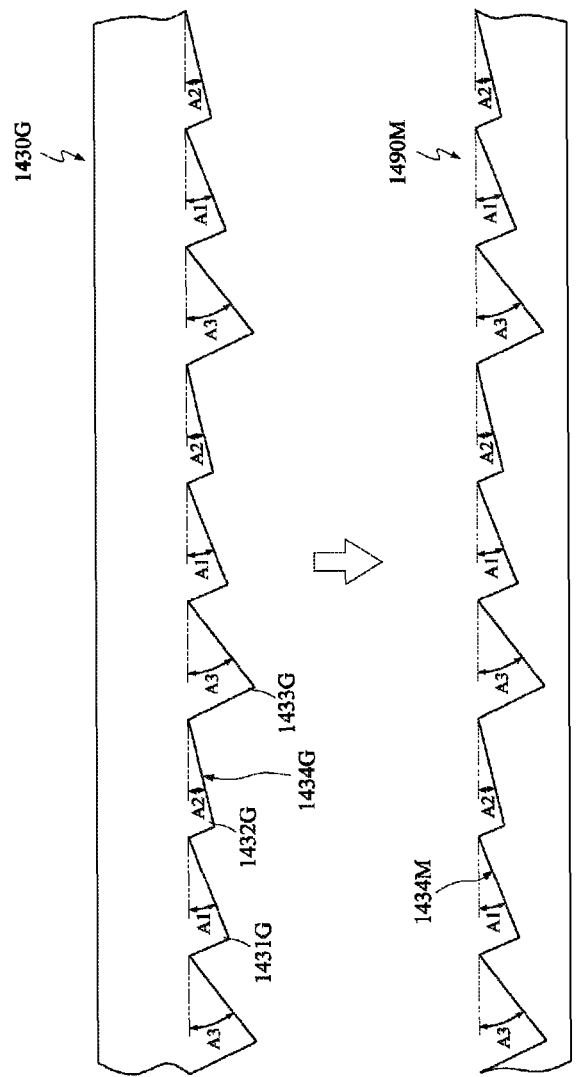
FIGS. 19I-19K are schematic cross-sectional views of various stages of manufacturing a mold in accordance with the fifteenth embodiment of the present disclosure.
Figure 19J:
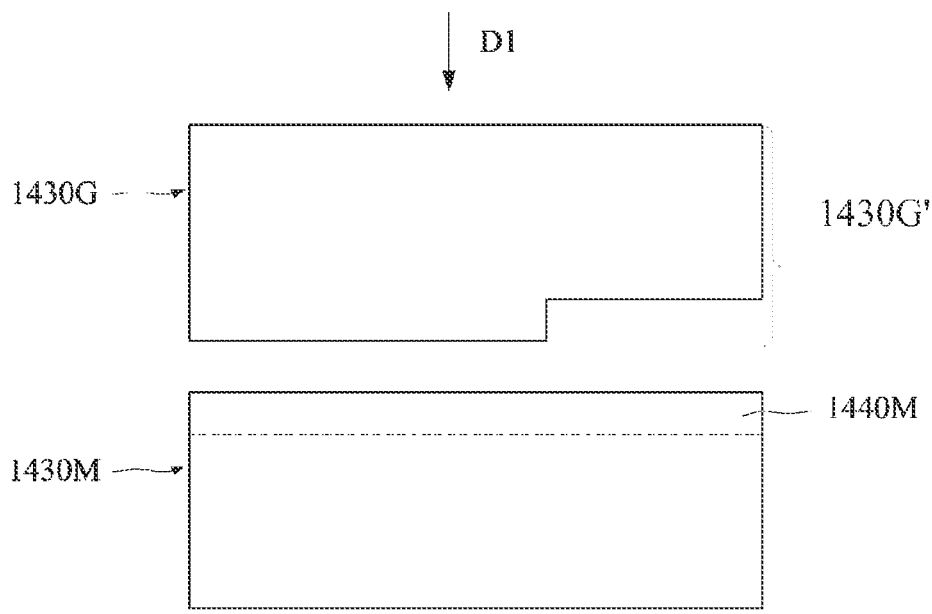
Figure 19K:
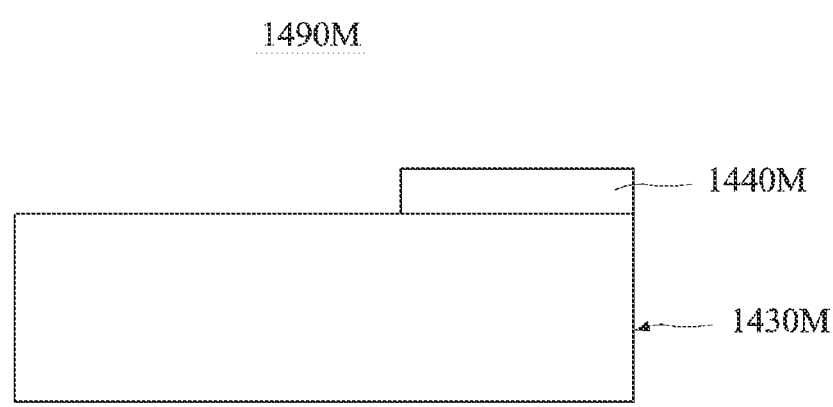

Although the fourteenth embodiment uses the manufacturing method described in the first embodiment as an example to manufacture the mold, it does not mean to limit the scope of the present disclosure. In other embodiments, those skilled in the art can use different methods to manufacture the mold according to the actual needs. For example, a mold can also be manufactured through another mold. FIGS. 19I-19K are schematic cross-sectional views of various stages of manufacturing a mold 1490M in accordance with a fifteenth embodiment of the present disclosure. As shown in FIGS. 19I-19K, in the fifteenth embodiment, the first grating main body 1430G' can be used to manufacture the mold 1490M. Herein, the profile of the first grating main body 1430G' that corresponds to the first profile 1434 is referred to as the second profile 1434G. In the fifteenth embodiment, based on the second profile 1434G, a second replication process is performed on the photoresist layer 1440M of the second main body 1430M along the top-view direction D1 to afford the mold 1490M.

In another example, the manufacturing methods illustrated in the second to eleventh embodiments can also be employed to manufacture the mold. The resulting mold can be used to make diffraction gratings by an imprinting process. Advantageous effects similar to those described in the previous embodiments can be obtained.

Sixteenth Embodiment

Figure 20:
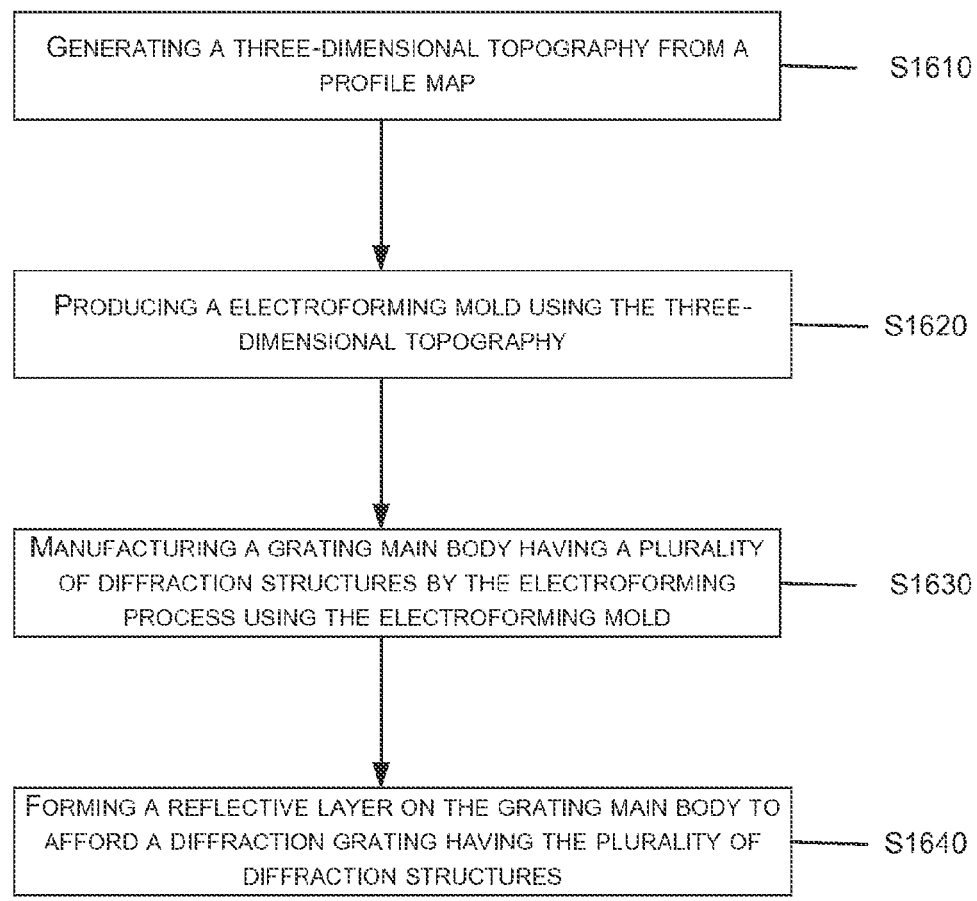
FIG. 20 is a flow diagram illustrating a method of manufacturing a diffraction grating in accordance with the sixteenth embodiment of the present disclosure.

Although the first embodiment uses a photolithographic process as an example to manufacture the diffraction grating, it is not meant to limit the scope of the present disclosure. In other embodiments, those skilled in the art can use other methods to manufacture the diffraction grating according to the actual needs. For example, the diffraction grating may be manufactured by an electroforming process using a mold. FIG. 20 is a flow diagram illustrating a method of manufacturing a diffraction grating in accordance with a sixteenth embodiment of the present disclosure. As shown in FIG. 20, the method of manufacturing a diffraction grating according to the sixteenth embodiment comprises the following steps.

First, at step S1610, a three-dimensional topography is generated based on the profile by adding thickness parameter to the profile.

Next, at step S1620, a mold is produced by the electroforming process based on the three-dimensional topography.

Next, at step S1630, a grating main body having diffraction structures is produced by the electroforming process using the mold.

Next, at step S1640, a reflective layer is disposed on the grating main body to form the diffraction grating.

The structure corresponding to each of these steps can be found in first to eleventh embodiments, and thus will not be described herein again in the interest of brevity. Advantageous effects similar to those described in previous embodiments can be achieved in the diffraction grating manufactured in accordance with the sixteenth embodiment.

Seventeenth Embodiment

Although in the sixteenth embodiment, the electroforming process uses a three-dimensional topography as an example, it is not meant to limit the scope of the present disclosure. In other embodiments, those skilled in the art can use other methods to manufacture the mold produced by the electroforming process according to the actual needs. For example, a process of a seventeenth embodiment is similar to that of the sixteenth embodiment, except that in the seventeenth embodiment, the methods of manufacturing a diffraction grating described in the first to eleventh embodiment are used to make the mold, and then steps S1630 to S1640 described in the sixteenth embodiment are used to make the diffraction grating. The resulting diffraction grating exhibits effects similar to those obtained in the first to eleventh embodiments.

Eighteenth Embodiment

Figure 21:
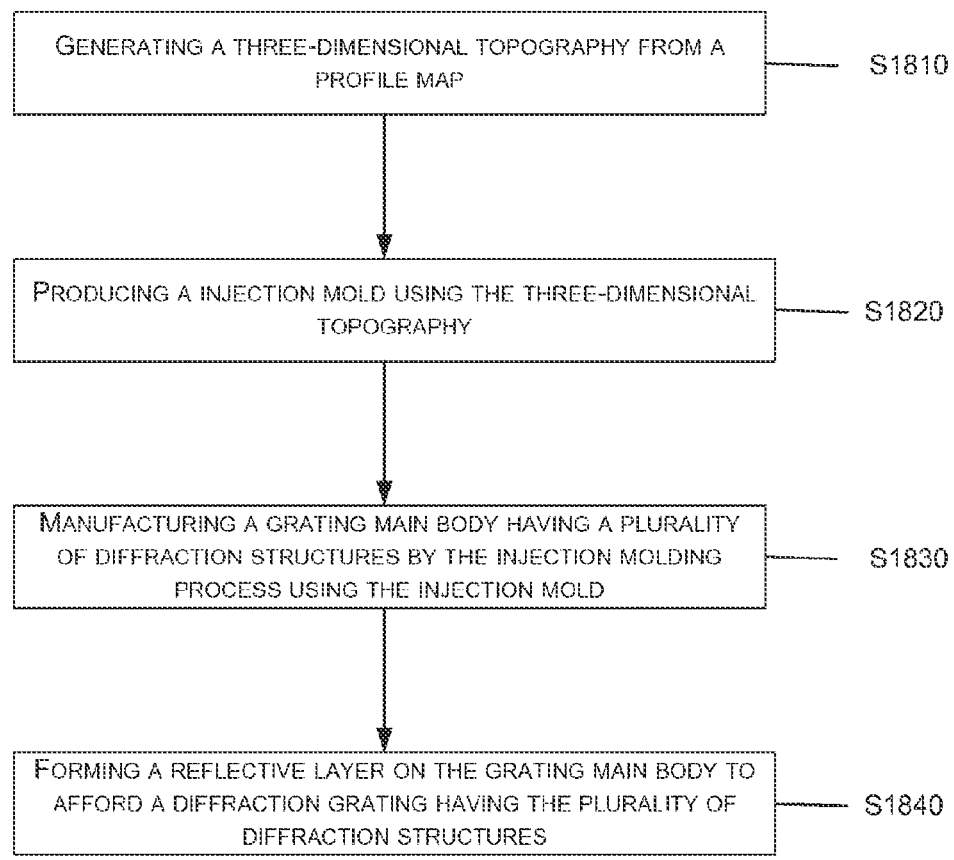
FIG. 21 is a flow diagram illustrating a method of manufacturing a diffraction grating in accordance with the eighteenth embodiment of the present disclosure.

Although the sixteenth embodiment uses a mold produced by the electroforming process as an example, it is not meant to limit the scope of the present disclosure. In other embodiments, those skilled in the art can use other manufacturing methods to make the mold according to the actual needs. For example, FIG. 21 is a flow diagram illustrating a method of manufacturing a diffraction grating in accordance with an eighteenth embodiment of the present disclosure. As shown in FIG. 21, the method of manufacturing a diffraction grating of the eighteenth embodiment comprises the following steps.

First, at step S1810, a three-dimensional topography is generated based on the profile.

Then, at step S1820, a master is produced by injection molding based on the three-dimensional topography.

Subsequently, at step S1830, a grating main body having diffraction structures is produced by the injection molding process using the mold.

Next, at step S1840, a reflective layer is disposed on the grating main body to form the diffraction grating.

The structures corresponding to each of these steps can be found in the first to eleventh embodiments, and thus will not be described herein again in the interest of brevity. Advantageous effects similar to those in the previous embodiment can be achieved in the diffraction grating manufactured in according with the eighteenth embodiment.

Nineteenth Embodiment

Although the sixteenth embodiment uses a mold produced by the electroforming process as an example, it is not meant to limit the scope of the present disclosure. In other embodiments, those skilled in the art can use other manufacturing methods to make the mold according to the actual needs. For example, a process in a nineteenth embodiment is similar to that of the eighteenth embodiment, except that, in the nineteenth embodiment, the mold is produced by manufacturing methods as described in the first to eleventh embodiments, and then steps S1830 to S1840 described in the eighteenth embodiment are used to make the diffraction grating. The resulting diffraction grating exhibits effects similar to those obtained in the first to eleventh embodiments.

Twentieth Embodiment

Although the fourteenth to nineteenth embodiments use a diffraction grating obtained by replicating one mold as an example, they are not meant to limit the scope of the present disclosure. In other embodiments, those skilled in the art can use several molds to manufacture the diffraction grating according to the actual needs. For example, a process of a twentieth embodiment is similar to those of the fourteenth to nineteenth embodiments, except that in the twentieth embodiment, the mold obtained through the imprinting process (electroforming/injection molding) using manufacturing methods described in the fourteenth to nineteenth embodiments is used as the first mold, and the first master mold is then used to form a second mold by the imprinting process (electroforming/injection molding). The second mold can then be used to manufacture the diffraction grating.

Twenty-First Embodiment

Although the twentieth embodiment uses the same manufacturing process as an example to illustrate the process of making the two molds, it is not meant to limit the scope of the present disclosure. In other embodiments, those skilled can use different manufacturing processes to make molds according to the actual needs. For example, a method used in a twenty-first embodiment of the present disclosure is similar to that of the twentieth embodiment, except that in the twenty-first embodiment different processes are employed to make the first and the second molds. Thus, in one example of the present embodiment, the first mold is produced by the electroforming process, while the second mold is produced by the imprinting process. In another example of the present embodiment, the first mold is produced by the electroforming process, while the second mold is produced by the injection molding process, and so forth.

Twenty-Second Embodiment

Although FIG. 6B of the first embodiment uses a profile 110 containing numerous identical patterns 110S as an example, in other embodiments the profile 110 may also contain numerous different patterns. As a result, a diffraction grating having different structural characteristics can be produced on a single wafer.

Embodiments of the present disclosure provide the use of a variety of the blaze angles, thus providing a more flexible way to design diffraction gratings. Through adjusting the blaze angle for each of the diffraction structures, the diffraction efficiency curve of each of the diffraction structures can be varied. As a result, the diffraction efficiency of each of the diffraction structures can be increased at predetermined wavelengths. A diffraction grating with a predetermined total diffraction efficiency curve can be obtained. In addition, by using a profile to imprint the pattern of the diffraction grating, all of the diffraction structures can be produced at one time by, for example, etching or ruling. Such method no longer requires the use of a diamond cutting tool as in the conventional technology, thus eliminating the alignment problem arising from the need to change the cutting tools. Furthermore, since the profile corresponds to profiles of numerous diffraction gratings, it is possible to manufacture numerous diffraction gratings on a single wafer to meet the demand for flexible manufacturing. Moreover, the approach that uses the profile to fabricate a mold and then uses the resulting mold to manufacture the diffraction gratings can achieve mass production and reduced costs. In the present disclosure, the moving path of a light beam can also be employed as the profile to make the mold or diffraction structures of a diffraction grating. The resulting diffraction grating can possess various blaze angles. This approach can fulfill the design requirements and solve the alignment problem associated with the conventional technology.

From the foregoing it will be appreciated that, although specific embodiments of the present disclosure have been described herein for purpose of illustration, they should by no means be interpreted as limiting the scope of the present disclosure. Various modifications may be made therein without departing from the spirit and scope of the present disclosure.

What is claimed is:

1. A method of manufacturing a diffraction grating having a plurality of diffraction structures, comprising:
    forming a first patterned layer on a surface of a main body by performing a replication process depending on a profile defining the diffraction grating, and the profile comprising:
    a top-view pattern of the plurality of diffraction structures having a plurality of regular blaze angles respectively corresponding to the plurality of diffraction structures;
    wherein the plurality of regular blaze angles are defined at a side part of the top-view pattern of the plurality of diffraction structures, and at least one of the plurality of diffraction structures comprises a different corresponding regular blaze angle from a corresponding regular blaze angle of another of the plurality of diffraction structures;
    wherein the first patterned layer has a side surface and a top surface angled to the side surface, and the plurality of regular blaze angles of the plurality of diffraction structures are defined on the top surface of the first patterned layer;
    wherein the top-view pattern corresponds to the top surface; and
    forming a reflective layer on the main body by executing a reflective layer forming process via the first patterned layer, wherein a plurality of effective surfaces of the plurality of diffraction structures are formed on the side surface to reflect and diffract light incident towards the plurality of effective surfaces of the plurality of diffraction structures;
    wherein the plurality of diffraction structures having different blaze angles are produced at one time with the same replicating process on a single main body.

2. The method of claim 1, wherein the first patterned layer is a patterned photoresist layer.

3. The method of claim 1, wherein the main body is a silicon substrate or a silicon-on-insulator (SOI) substrate.

4. The method of claim 3, wherein the plurality of effective surfaces of the plurality of diffraction structures extend along at least one non-crystallographic direction of the silicon substrate.

5. The method of claim 1, wherein the profile is a photo mask, a shadow mask, or a moving path of a light beam.

6. The method of claim 1, wherein the replication process is a photolithographic process or a particle etching process.

7. The method of claim 1, wherein at least one of the plurality of diffraction structures comprises at least two different regular blaze angles respectively defined at two different locations along a corresponding effective surface of the at least one of the plurality of diffraction structures.

8. The method of claim 1, wherein executing the reflective layer forming process comprises:
    forming a second patterned layer underneath the first patterned layer through the first patterned layer;
    removing the first patterned layer; and
    forming the reflective layer on the second patterned layer.

9. The method of claim 1, wherein executing the reflective layer forming process comprises:
    forming a second pattern layer underneath the first patterned layer through the first patterned layer; and
    forming the reflective layer on the first and the second patterned layers.

10. The method of claim 1, wherein the plurality of diffraction structures are arranged along a curve surface which is not an arc curve and is defined and viewable along the top surface.

11. The method of claim 1, wherein the top surface defines a plurality of pitches of the plurality of diffraction structures.

12. The method of claim 1, wherein the profile further defines another diffraction grating located next to the diffraction grating on the main body, the plurality of diffraction structures of the diffraction grating are different from a plurality of diffraction structures of the another diffraction grating.

13. A method of manufacturing a mold for a diffraction grating having a plurality of diffraction structures, comprising:
    providing a profile defining the diffraction grating so that each of the plurality of the diffraction structures of the diffraction grating has a predetermined pitch; and
    performing a replication process on a surface of a main body depending on the profile replicating the mold for fabricating a diffraction grating, wherein:
    the profile comprises a top-view pattern of the plurality of diffraction structures appearing in a view along a first direction perpendicular to the surface of the main body, and a side part of the top-view pattern defines a plurality of regular blaze angles of the plurality of diffraction structures, and at least one of the plurality of diffraction structures comprises a different corresponding regular blaze angle from a corresponding regular blaze angle of another of the plurality of diffraction structures;
    wherein, when the mold is used to fabricating the diffraction grating, the plurality of diffraction structures having different blaze angles are produced at one time with the same replicating process on a single main body;
    wherein a plurality of effective surfaces of the plurality of diffraction structures are formed to reflect and diffract light incident towards the plurality of effective surfaces of the plurality of diffraction structures.

14. A method of manufacturing a diffraction grating, comprising: forming a three-dimensional topography using a profile;
    forming a mold using the three-dimensional topography;
    forming a grating main body using the mold, the grating main body comprising a plurality of diffraction structures; and
    disposing a reflective layer on the grating main body;
    wherein the profile comprises a top-view pattern of the plurality of diffraction structures appearing in a view along a direction perpendicular to a surface of the grating main body, and a side part of the top-view pattern define a plurality of regular blaze angles of the plurality of diffraction structures;

wherein at least one of the plurality of diffraction structures comprises a different corresponding regular blaze angle from a corresponding regular blaze angle of another of the plurality of diffraction structures; and wherein a plurality of effective surfaces of the diffraction structures appear in another view along another direction parallel to the surface of the grating main body;

wherein the plurality of diffraction structures having different blaze angles are produced at one time with the same replicating process on a single main body.

15. The method of claim 14, wherein forming the grating main body using the mold comprises an electroforming process or an injection molding process.

16. A method of manufacturing a hybrid diffraction grating having a plurality of diffraction structures, comprising:

forming a first main body having a plurality of diffraction structures by a first replication process with a mold, the plurality of diffraction structures arranged in a pattern appearing in a view along a first direction perpendicular to a surface of the first main body, wherein the pattern is made by a first profile of the mold, and a side part of the pattern defines a plurality of regular blaze angles of the plurality of diffraction structures, and at least one of the plurality of diffraction structures comprises a different corresponding regular blaze angle from a corresponding regular blaze angle of another of the plurality of diffraction structures; and executing a reflective layer forming process to deposit a reflective layer on the plurality of diffraction structures;

wherein the plurality of diffraction structures having different blaze angles are produced at one time with the same replicating process on a single first main body;

wherein a plurality of effective surfaces of the plurality of diffraction structures are formed to reflect and diffract light incident towards the plurality of effective surfaces of the plurality of diffraction structures.

17. The method of claim 16, further comprising:

forming a second mold by performing a second replication process on a first patterned layer formed on a surface of a second main body along a direction perpendicular to the surface of the second main body based on a second profile, wherein the second profile corresponds to the first profile.

18. The method of claim 16, wherein the first replication process comprises a semiconductor etching process, a reactive-ion etching process, laser processing, electron beam processing, an X-ray etching process, an injection molding process, an imprinting process, or an electroforming process.

* * * * *